(12) United States Patent
Conescu et al.

(10) Patent No.: US 8,237,940 B2
(45) Date of Patent: Aug. 7, 2012

(54) EXTENSIBLE CONTROL OF DOCUMENT PROCESSING

(75) Inventors: Ronald M. Conescu, Mountain View, CA (US); Kurt Knodt, Los Altos, CA (US); Yue Liu, San Jose, CA (US); Loc T. Le, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 975 days.

(21) Appl. No.: 12/205,805

(22) Filed: Sep. 5, 2008

(65) Prior Publication Data
US 2010/0060909 A1    Mar. 11, 2010

(51) Int. Cl.
*G06F 3/12* (2006.01)

(52) U.S. Cl. ........ 358/1.13; 715/710; 715/713; 715/762; 715/764; 715/769

(58) Field of Classification Search ................ 358/1.15, 358/1.13; 700/220; 715/710, 713, 762, 764
See application file for complete search history.

(56) References Cited

U.S. PATENT DOCUMENTS

| | | | |
|---|---|---|---|
| 2005/0223375 A1 | 10/2005 | Duggan | |
| 2007/0179665 A1* | 8/2007 | Welch et al. | 700/220 |
| 2007/0260973 A1 | 11/2007 | Kano | |
| 2008/0170254 A1* | 7/2008 | Shah | 358/1.15 |
| 2009/0244598 A1* | 10/2009 | Shen et al. | 358/1.15 |
| 2009/0251721 A1* | 10/2009 | Knodt et al. | 358/1.15 |
| 2009/0288004 A1* | 11/2009 | Strandell et al. | 715/710 |

OTHER PUBLICATIONS

Open-Xchange, GUI Plugin Development. Published by Open-Xchange [online]. Sep. 2008 [retrieved on Oct. 7, 2008]. pp. 1-6. Retrieved from the Internet: <URL:http://www.open-xchange.com/wiki/index.php? title=Gui_Plugin_Development >.

Baudais, et al., GUI Widgets, The Gnumeric Manual Version 1.8. Published by GNOME: The free Software Desktop Project [online]. Nov. 2007 [retrieved on Oct. 7, 2008]. pp. 1-2. Retrieved from the Internet: <URL:http://www.gnome.org/projects/gnumeric/doc/sect-graphics-widgets.shtml >.

* cited by examiner

*Primary Examiner* — Benny Q Tieu
*Assistant Examiner* — Juan Guillermety
(74) *Attorney, Agent, or Firm* — Hickman Palermo Truong Becker Bingham Wong LLP

(57) ABSTRACT

In an embodiment, a method comprises, in a print application management computer program that enables a user to generate a printed application using one or more document processing devices: identifying a plug-in that extends one or more capabilities of the print application management computer program; extending the print application management computer program to include the identified plug-in, including reconfiguring a graphical user interface of the print application management computer program to include one or more GUI widgets associated with the identified plug-in.

20 Claims, 15 Drawing Sheets

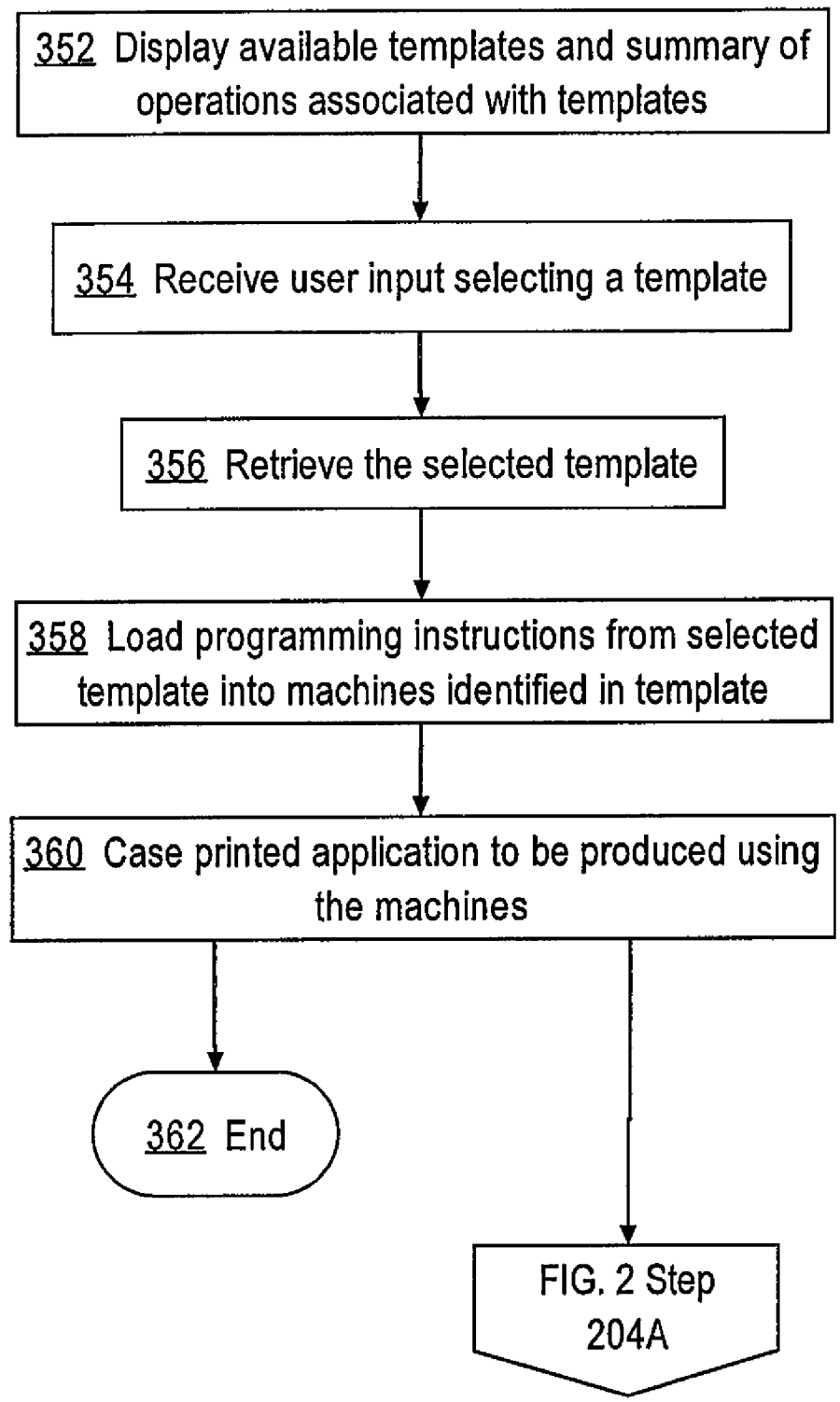

EXTENSIBLE CONTROL OF DOCUMENT PROCESSING

TECHNICAL FIELD

The present disclosure generally relates to dynamically extending computer programs, in the context of printed application management programs that manage document processing using printers, copiers, finishers, and other document handling machines.

BACKGROUND

Document processing equipment such as multifunction printer (MFP) devices, photocopiers, and laser printers can be used to create both simple documents and complex printed media applications such as business cards, postcards, books, booklets, and other applications. Proper production of such printed media applications often requires the use of separate finishing machines after printing or copying is complete. Examples of finishing machines include cutters, slicing machines, creasers, trimmers, punchers, binding machines, coating machines, and multi-function finishers.

However, in current practice the persons operating such equipment in a busy production environment that is handling many different jobs may have difficulty in properly configuring or programming a finishing machine for a particular job. For example, a printer or copier may print or copy several different jobs all of which are completed at successive times and require finishing. The finishing machines require configuration or programming to properly finish each printed job. Under some circumstances, it may be difficult for operators to determine what configuration or programming is appropriate for a particular printed job. For example, if multiple printed jobs are completed near the same time and placed in a holding area, for each particular job the operator must locate an order sheet or other information that is associated with the particular job and specifies how to finish the job. If the order sheet or other information is misplaced then substantial delay or confusion can occur about how to program the finishing machine for that job.

Current manual configuration methods for finishing machines are also subject to human error and are time-consuming. There is no simple, automatic method for modifying the graphical user interface of a control station to accommodate different devices. There is no simple, automatic method for introducing control programs and graphical user interface information for new devices into a control station. Extensible software architectures are known in other contexts and can use modular software and error-checking. Object-oriented software design techniques can be used to establish generalized software architectures. Plug-in software modules have been used to extend the Mosaic web browser and as part of the "control panel" of Apple, Inc. Multiple user interfaces have been used for the same set of data using a data model that provides a view or interacts with a controller for the data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In an embodiment, a data processing method or apparatus implement a process of adding functional components to a production printing system or printing management application. In an embodiment, the process discovers one or more plug-in components for the production printing system by first searching for a specified storage location. The process determines whether the storage location contains one or more plug-in components of specified types. The process determines, for each plug-in, one or more references to other components. The process minimally disables a plug-in, or part of a plug-in, which requires an unavailable referenced component or plug-in. Thus, the process expects plug-ins to refer to each other in particular ways and fails gracefully if a plug-in required by another plug-in cannot be found.

In an embodiment, the production printing system enables a user to use the plug-ins in novel ways. For example, using the currently-selected user interface, the user can select a print application from a list of discovered templates. In this context, a template comprises internal data that is used to present an application to the end user; thus, in an embodiment, end users generally do not interact with templates through a graphical user interface. In some cases, as a debugging aid, administrative users may see the term "template" in the GUI. In general, in an embodiment, the end-user selects an application, which is internally represented by a template.

The user can specify one or more files of artwork and/or variable data, as requested by the selected template. The user is then guided through the steps required by the template, and the devices required by that template, to format the artwork and data as required by the template and devices, send the printable image(s) to the printer(s) specified by the template, and move the printed paper from machine to machine as required.

In an embodiment, a method comprises, in a print application management computer program that enables a user to generate a printed application using one or more document processing devices: identifying a plug-in that extends one or more capabilities of the print application management computer program; extending the print application management computer program to include the identified plug-in, including reconfiguring a graphical user interface of the print application management computer program to include one or more GUI widgets associated with the identified plug-in.

In an embodiment, said identified plug-in represents a printed application. In an embodiment, said identified plug-in represents a document processing device. In an embodiment, the method further comprises identifying a document processing device plug-in that is referenced in said identified printed application plug-in; and said extended print management computer program includes the ability to use said document processing device for the processing of said printed application.

In an embodiment, the identifying step comprises receiving the identified plug-in through user input associated with dragging a representation of the plug-in into a hierarchical tree of other plug-ins. In an embodiment, the method further comprises determining one or more second plug-ins that are referenced in the identified plug-in; determining whether the second plug-ins are available; when one or more of the second plug-ins is not available, disabling the first plug-in and generating a user notification; performing the extending only when all of the second plug-ins are available.

In an embodiment, the method further comprises receiving first user input that selects a template for a printed application, and the template identifies one or more document processing devices for use in producing the printed application; receiving second user input that specifies one or more artwork elements or data variables; generating user instructions for formatting the artwork elements or data variables as defined in the template and as required by the document processing devices, sending one or more printable images to the document processing devices, and moving printed sheets among the document processing devices according to the template to result in generating the printed application.

In an embodiment, generating user instructions comprises generating printed user instructions. In an embodiment, the method further comprises identifying, within a particular one of the plug-ins, a description of one of the document processing devices; determining, by attempting network communications to the document processing device, whether the document processing device is available; generating a user notification when the document processing device is not available.

In an embodiment, the method further comprises receiving an application identifier value associated with a printed application; receiving a media size; receiving a machine identifier value associated with a first document processing machine; determining programming instructions for a second document processing machine based on said received application identifier value, media size, and machine identifier value.

In an embodiment, the method further comprises sending said programming instructions over a network to the second document processing machine. In an embodiment, receiving said machine identifier comprises receiving the machine identifier from data entered from any of a computer display, or a handheld device display.

In an embodiment, the method further comprises determining the programming instructions for said first document processing machine; and said determinations are made at substantially the same time. In an embodiment, the method further comprises receiving artwork of the printed application; receiving one or more selections of a plurality of document processing machines; formatting said artwork into a printable format that is compatible for processing by the document processing machines of the one or more selections.

In an embodiment, the formatting comprises specifying a plurality of printed applications on each printed sheet. In an embodiment, the formatting comprises generating a plurality of operator instructions on a printed sheet. In an embodiment, the generating comprises generating particular operator instructions which when used with a document processing machine cause the document processing machine to remove at least one, but not all of said plurality of operator instructions.

In an embodiment, based on said selections of the plurality of document processing machines, the formatting comprises positioning said artwork at an integral multiple of the precision level of the least precise document processing machine.

BRIEF DESCRIPTION OF THE DRAWINGS

In the drawings:

FIG. 3B illustrates controlling a document processing workflow using a template.

DETAILED DESCRIPTION

Figure 1A:
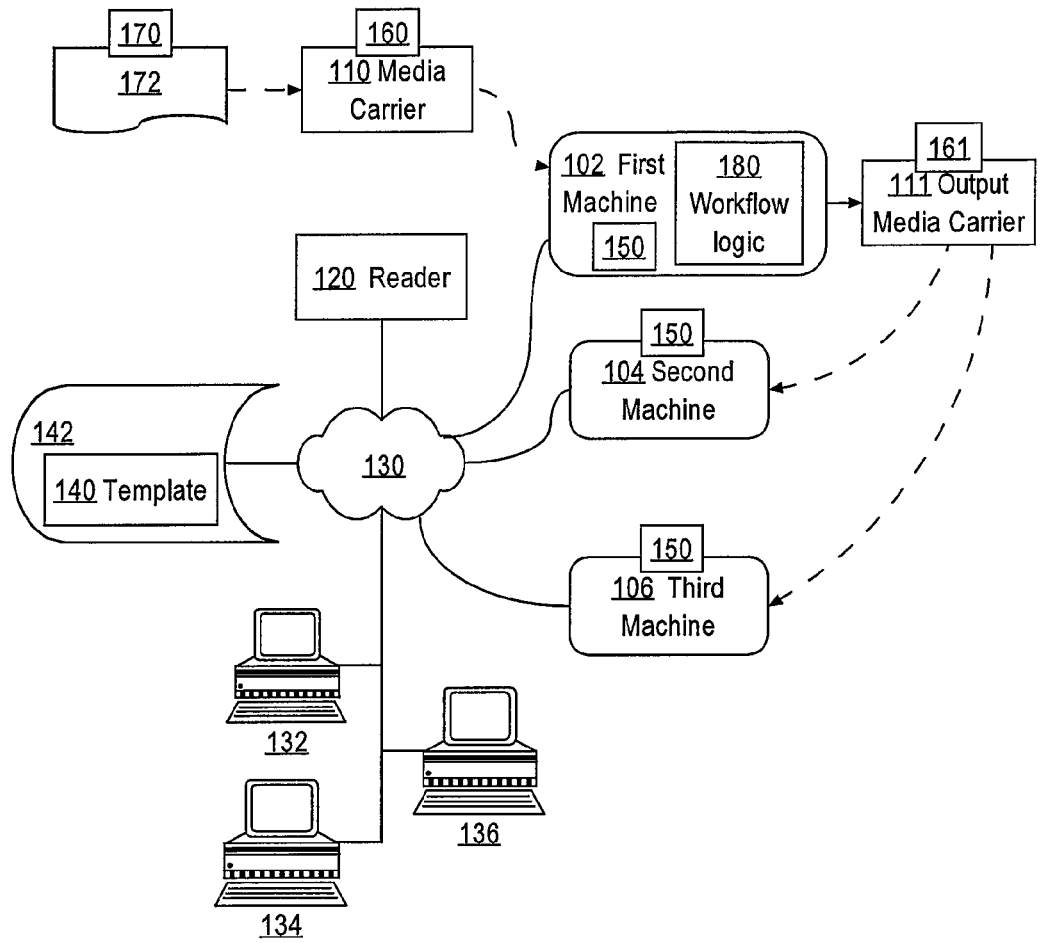
FIG. 1A illustrates an example production printing system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Structural & Functional Overview

In an embodiment, each machine in a workflow has a barcode that, along with a bar code on the current job printout, can be scanned to program that machine. Embodiments may be used as part of a semi-automated process to transfer sheets from the printed output tray to the finisher input source, for finishers that do not normally have an in-line connection to a printer. In an embodiment, the same paper tray or carrier is shared among multiple machines as part of a multi-machine workflow. Various embodiments accommodate multiple-pass workflow through a finishing device and multiple physical finishing operations.

In an embodiment, printed sheets comprising templates of operational instructions can be generated automatically based on known physical characteristics in a workflow. Templates capture dynamic sets of operations or activities in a file. Each template defines a specific combination of selected options. The operations or activities may relate to one machine or multiple machines that cooperate to create a complex printed application.

In an embodiment, a user interface for a machine or for a management computer is generated dynamically based on a template. For example, based on the template the user interface indicates what finishing operations are currently to be performed and what printing is to be performed on other machines in future steps to create a print application. In an embodiment, a template creates the GUI using a DLL that is present on a host computer or processing machine and configures one or more options on the screen appropriately. Generating the GUI may comprise dynamic radio button creation and automatic alignment of control buttons. The GUI may comprise one or more HTML documents, a bitmapped image, or other output formats.

Various embodiments use output paper carriers comprising a paper tray, bin, basket, cart, or any other physical or mechanical carrier of paper or other media that can be printed upon. In an embodiment, the carrier comprises instruction data that can direct a machine to generate a printed application. For example, instruction data may comprise an RFID tag, bar code, optically readable characters, or other detectable encoding.

In another embodiment, printed sheets include instruction data that can direct a machine to generate a printed application. The instruction data may overlay an image of a sheet of the printed application or may be printed on a separate sheet.

In yet another embodiment, a portable reader is configured to scan encoded indicia on a machine, scan printed sheets, and cause the machine to start processing the printed application. The portable reader may be coupled to the machine only or may be coupled to a network to which the machine is also coupled. In an embodiment, process control logic in the machine detects whether the instructions are incorrect for the machine. For example, if a carrier is presented to a cutter and the instructions on an RFID tag on the carrier specify that the next operation is a coating operation, then the cutter signals an error or warning to an operator.

The instructions may be modified at each station to reflect the current state of the process. A stand-alone architecture or networked architecture may be used.

2.0 Examples of Structural & Functional Implementation

FIG. 1A illustrates an example production printing system. A first machine 102, second machine 104, and third machine 106 are arranged in a printing facility. Each of the first machine 102, second machine 104, and third machine 106 may comprise any kind of document processing system. Examples include printers, scanners, copiers, multifunction printers, and finishing machines such as cutters, punches, staplers, binders, drills, etc. Each of the machines 102, 104, 106 comprises the combination of a subsystem that is configured to process sheets in printing or finishing operations, a communication interface, program logic, a processor, local storage, and other elements as further described herein.

In an embodiment, first machine 102, second machine 104, and third machine 106 are communicatively coupled to a local area network 130. One or more computers 132, 134, 136 may be coupled to the network and each may include a storage system; alternatively, a storage system 142 may be coupled to the network. A reader 120 may be coupled to the network.

The network 130 may comprise a wired network, wireless network, or combination. The network 130 may comprise any form of data link, network or networks that can communicate data among reader 120, the machines 102-106, data storage system 142, and computers 132-136. Network 130 broadly represents networks and other forms of communication connection using any one or more of the following physical connections: Ethernet, USB, SCSI, Firewire, 802.11, serial cable, Bluetooth.

In an embodiment, each of the first machine 102, second machine 104, and third machine 106 may accept a media carrier 110, which can carry one or more sheets 172. Each machine also may comprise one or more output media carriers 111 that can receive one or more sheets that have been printed, finished or otherwise processed in the machine. Examples of apparatus useful as the media carrier 110, 111 include paper trays, bins, baskets, carts, or any other physical or mechanical carrier of paper or other media that can be printed upon. In an embodiment, the machines are co-located in a production printing facility in which printed applications, such as booklets, books, reports, postcards, photographs, brochures, or other materials are printed and finished; however, in other embodiments the machines are not co-located.

In an embodiment, the output media carrier 111 can be removed from a machine after the machine has processed sheets and delivered the sheets to the output media carrier, and the output media carrier can be moved to another machine for further processing of the same sheets. For example, sheets 172 may be placed in media carrier 110, printed in first machine 102 and delivered to output media carrier 111, which is then physically moved to and secured to second machine 104, which performs a finishing operation such as cutting or punching.

In an embodiment, each of the first machine 102, second machine 104, and third machine 106 comprises a readable encoding 150. In various embodiments, the readable encoding 150 comprises a bar code indicia or label, a radio frequency identification (RFID) tag, etc. In each such embodiment, the readable encoding 150 encodes data that uniquely identifies a type of machine with which the encoding is associated. For example, the data encoded in a readable encoding 150 may indicate that the associated machine is of a particular type, manufacturer, model number, etc. The readable encoding 150 may encode capabilities of the associated machine. The readable encoding 150 may comprise a unique identifier of the associated machine.

In an embodiment, media carrier 110 comprises a readable encoding 160 and output media carrier 111 comprises a readable encoding 161. Alternatively, only one of the media carrier 110 and output media carrier 111 may comprise a readable encoding, rather than both. In various embodiments, the readable encodings 160, 161 comprise a bar code indicia or label, radio frequency identification (RFID) tags, etc. In each such embodiment, the readable encodings 160, 161 encode data that identifies what kind of machine processing should be performed on media that is contained in the media carrier. For example, assume that the media carrier is carrying 11"×17" printed sheets for an 8-page brochure that is center stapled. The data encoded in a readable encoding 160, 161 may specify printing processes comprising printing brochure art in a particular orientation, and finishing processes comprising loading two sheets into a stack, creating a center fold in the sheets, and applying three staples to the center fold, resulting in a finished brochure. In other embodiments the readable encodings 160, 161 may specify any other suitable processing, printing, or finishing operations.

In an embodiment, sheets 172 comprise one or more readable encodings 170. In various embodiments, the readable encodings 170 comprise bar code indicia or labels, radio frequency identification (RFID) tags, etc. In each such embodiment, the readable encodings 170 encodes data that identifies what kind of machine processing should be performed on the sheets 172. For example, the data encoded in a readable encoding 170 may indicate that the sheets 172 next require three-hole punching.

Reader 120 is configured to read any of the encodings 150, 160, 170 and provide data encoded in the encodings, or instructions based on the encodings, one or more of the first machine 102, second machine 104, and third machine 106. In one embodiment as shown in FIG. 1A, reader 120 is coupled to network 130 and provides the data or instructions to the machines over the network. Thus, reader 120 communicates over network 130 to computers 132, 134, 136. There may be more than one reader 120 and using one reader for each operator of a machine is contemplated. In another embodiment, reader 120 is not coupled to the network 130 and operates in a stand-alone mode in which the reader 120 is directly coupled to a machine and provides the data or instructions to the machine through the direct coupling. In another embodiment, reader 120 is directly coupled to one of the computers 132, 134, 136.

Template 140 comprises stored data that represent a sequence of printing and finishing operations to be performed for creating a particular printed application. For example, template 140 may specify printing 50 duplex collated copies of a set of sheets on first machine 102, inserting transparent covers in the collated sets using second machine 104, and applying a spiral binding to the collated sets using third machine 106. In an embodiment, template 140 comprises instructions about how to print the stored data on printed sheets. For example, template 140 may comprise encoded data which, when printed on a computer printer of the network 130 or printed on one of the machines 102, 104, 106, results in printing bar code indicia on one or more sheets, where the bar code indicia are readable by reader 120.

Figure 6:
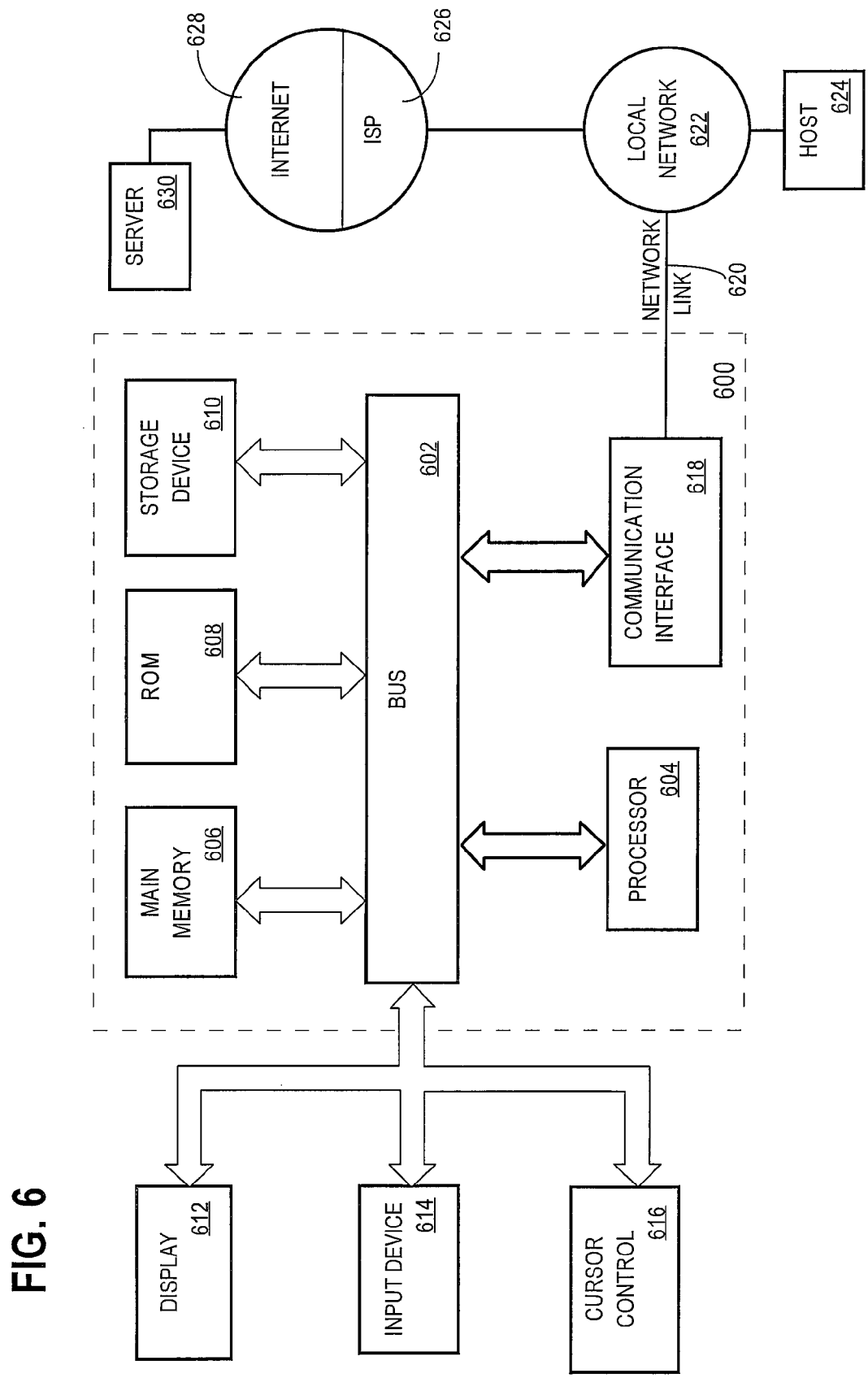
FIG. 6 illustrates a computer system upon which an embodiment of the invention may be implemented.

In an embodiment, each machine 102, 104, 106 comprises workflow logic 180 that implements the document processing workflow processes that are described further herein. Workflow logic 180 may comprise instructions encoded in memory, other software elements, firmware, or a combination. Alternatively, one of the computers 132, 134, 136 may host workflow logic 180. A computer attached directly to a machine 102, 104, 106 also may locally host the workflow logic 180 and provide instructions to the associated machine via a connection to the machine. FIG. 6, described below, provides an example of a host computer, or one of the computers 132, 134, 136, or general-purpose computer components that can be incorporated into one of the machines 102, 104, 106 for use as the workflow logic 180.

Figure 1B:
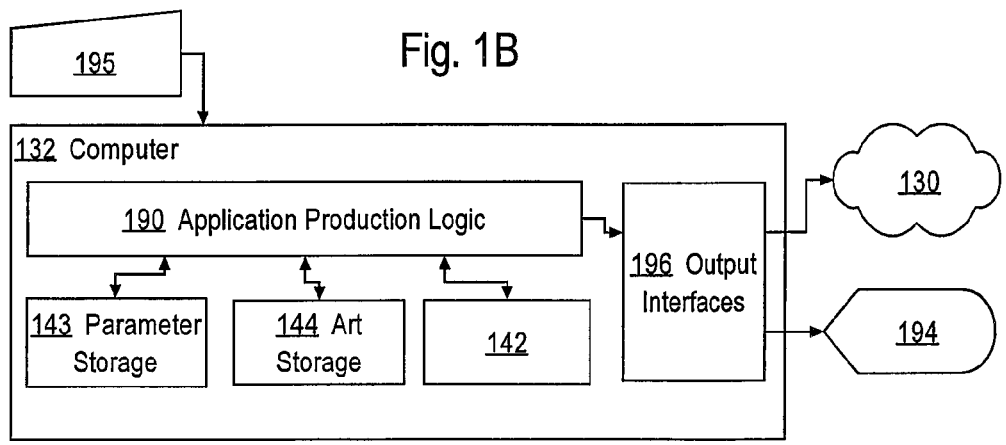
FIG. 1B illustrates an example computer architecture using application production logic.

FIG. 1B illustrates an example computer architecture using application production logic. As an example, computer 132 comprises application production logic 190, parameter storage 143, art storage 144, storage 142, and output interfaces 196. In general, application production logic is configured to receive data input from one or more users from one or more input devices collectively represented by input device 195. Example input devices include a keyboard, voice input device, mouse, trackball, or other pointing device. Application production logic 190 displays a user interface that can receive user selections of printed application types, parameter values for document processing machines that can be used to produce a printed application, media size value, and parameter values for a selected printed application. Examples of media size values include Letter, A4, 17"×11", 18"×12", etc. Based on the user selections, application production logic 190 generates a programmed workflow comprising one or more parameter values for the machines and for the application. Further, application production logic 190 can generate printed sheets bearing indicia which, when read at a reader, can configure one or more of the machines to operate in accordance with the parameter values. The application production logic 190 also can save the parameter values in a named set in the parameter storage 143 or in networked storage 142 (FIG. 1A) for retrieval in response to reading the indicia or loading a template. The preceding functions of the application production logic 190 are described further below.

Alternatively, one of the machines 102, 104, 106 may host the application production logic. Further, a computer that is coupled to one of the machines 102, 104, 106, e.g., a computer serving as a manager for such a machine, may host the application production logic.

The art storage 144 is configured to store images for printing as part of a printed application. Examples of art include business card images, brochure images, book text or cover art, or any other information that can be printed. Art may be stored in art storage 144 in any convenient file format such as PDF, JPG, etc.

Storage 142 may be hosted within computer 132 or elsewhere in network 130. Storage 142 may be configured to store program files for application production logic 190, program data, or other information useful in the operations of the application production logic as further described herein.

The output interfaces 196 couple the computer 132 and application production logic 190 to network 130 and one or more output devices such as a display 194. In an embodiment, application production logic 190 generates a graphical user interface in cooperation with an operating system and/or one or more middleware layers and GUI screen images are displayed on display 194. However, application production logic 190 also may use a character-based interface, command-line interface, terminal interface, or other mechanism for receiving user input and displaying output. Output interfaces 196 also permit application production logic 190 to generate printed output on a printer or other output device. The printed output may include specialized indicia such as bar code symbols.

Figure 1C:
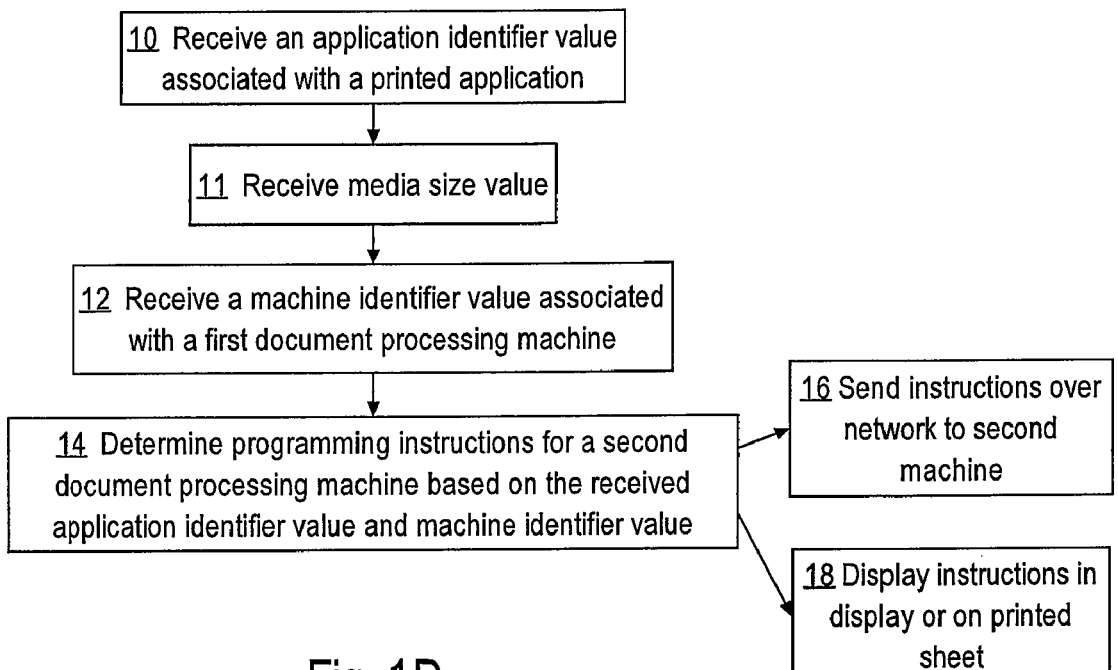
FIG. 1C illustrates a method of manufacturing a printed application with a plurality of document processing machines, in one embodiment.

FIG. 1C illustrates a method of manufacturing a printed application with a plurality of document processing machines, in one embodiment. In step 10, an application identifier value associated with a printed application is received. For example, a user selects an icon representing a particular application in a graphical user interface that is generated by the application production logic 190, and the logic transforms the icon selection into an identifier value that is stored in memory. Examples of printed applications include business cards, books, brochures, and all other types of printed applications described elsewhere in this document.

In step 11, a media size value is received. For example, a user selects an icon representing a particular sheet size, paper size or other media size in the graphical user interface of the application production logic 190, and the logic transforms the icon selection into an identifier value that is stored.

In step 12, a machine identifier value associated with a first document processing machine is received. For example, a user selects an icon representing a particular printer, finisher, or other document processing machine in the graphical user interface, and the application production logic 190 transforms the icon selection into a stored value identifying the selected machine.

In step 14, programming instructions are determined for a second document processing machine, based on the received application identifier value, media size, and machine identifier value. For example, the application production logic 190 automatically determines, based on hard-coded logic, lookup tables, templates or other sources, one or more commands or instructions which when received and executed by the second machine will cause programming the second machine to print or finish the specified application using the specified media in a way that is compatible with the first machine, the requirements of the application, and the processing resulting from the first machine. For example, the first machine could be a printer and the second machine could be a finisher, and instructions for the printer may require adjustment to accommodate the capabilities of the finisher. Alternatively, instructions for the finisher may require adjustment to accommodate the capabilities of the printer.

In various embodiments, the programming instructions are sent over a network to the second document processing machine, as seen in step 16. The programming instructions may be displayed on a computer display, on a handheld device display, on a display of the second document processing machine, or on a printed sheet, as indicated at step 18. Further, in an embodiment, the programming instructions may be determined for the first document processing machine. For example, the logic may automatically determine programming instructions that will cause the first document processing machine to produce the printed application using the specified media.

Receiving the application identifier may comprise receiving the application identifier from any of a printed page of said printed application, a printed page that is not part of said printed application, or an output paper carrier. Receiving the application identifier may comprise receiving the application identifier from any of an RFID tag, bar code, or alphanumeric text. Receiving the machine identifier may comprise receiving the machine identifier from the first document processing machine.

Receiving the machine identifier may comprise receiving the machine identifier from any of an RFID tag, bar code, or alphanumeric text. Receiving the machine identifier may comprise receiving the machine identifier from data entered from any of a computer display or a handheld device display. The machine identifier may be displayed as a selected item on the display.

Determining the programming instructions may comprise determining the programming instructions for the first document processing machine or for any other document processing machine, whether associated with the machine identifier or not.

Figure 1D:
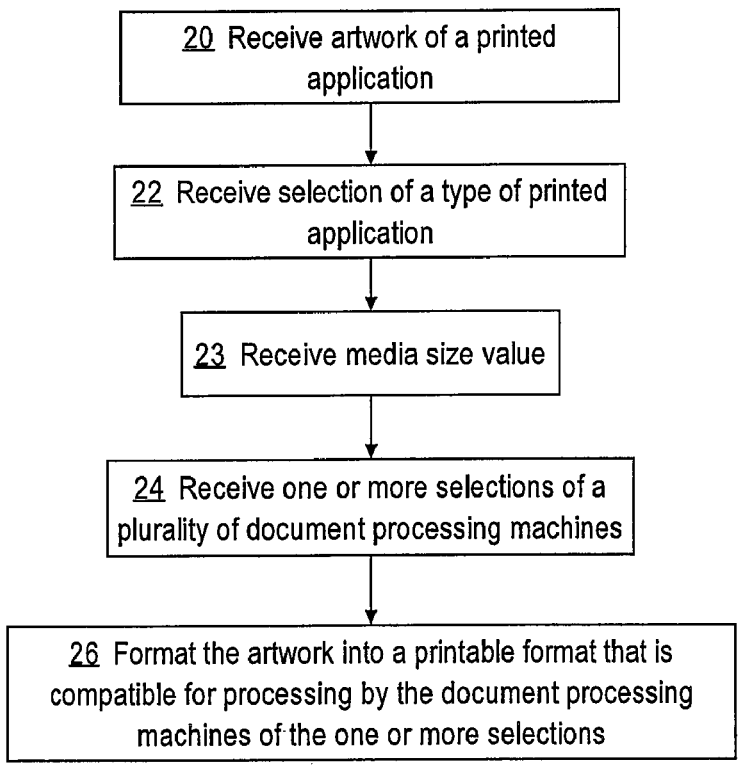
FIG. 1D illustrates a method of manufacturing a printed application with a plurality of document processing machines, in one embodiment.

FIG. 1D illustrates a method of manufacturing a printed application with a plurality of document processing machines, in one embodiment. In step 20 artwork of a printed application is received. For example, a user interacts with the graphical user interface of the application production logic 190 to load a graphic image file that represents artwork to be printed.

In step 22, a selection of a type of printed application is received. In step 23, a media size value is received. Steps 22, 23 may be implemented in the same manner described above for steps 10, 11 of FIG. 1C.

In step 24, one or more selections of a plurality of document processing machines are received. Step 24 may be implemented in the same manner described above for step 12 of FIG. 1C.

In step 26, the artwork is formatted into a printable format that is compatible for processing by the document processing machines of the one or more selections. Formatting may comprise changing the digital image format of the artwork, or resizing, replication (e.g. duplicating multiple copies on a single sheet), or changing a position the artwork, or other changes in appearance, position, or layout.

In an embodiment, the artwork is formatted into one of PDF, PostScript, PCL, XML, or JDF. In an embodiment, one or more printed applications are specified on each printed sheet. In an embodiment, one or more operator instructions are specified or generated on a printed sheet. In an embodiment, particular operator instructions are generated, and when used with a document processing machine, the operator instructions cause the document processing machine to remove at least one, but not all of the operator instructions.

In an embodiment, based on the selections of the document processing machines, the formatting comprises positioning the artwork at an integral multiple of the precision level of the least precise document processing machine. In an embodiment, the least precise value is a tenth of a millimeter.

Figure 2:
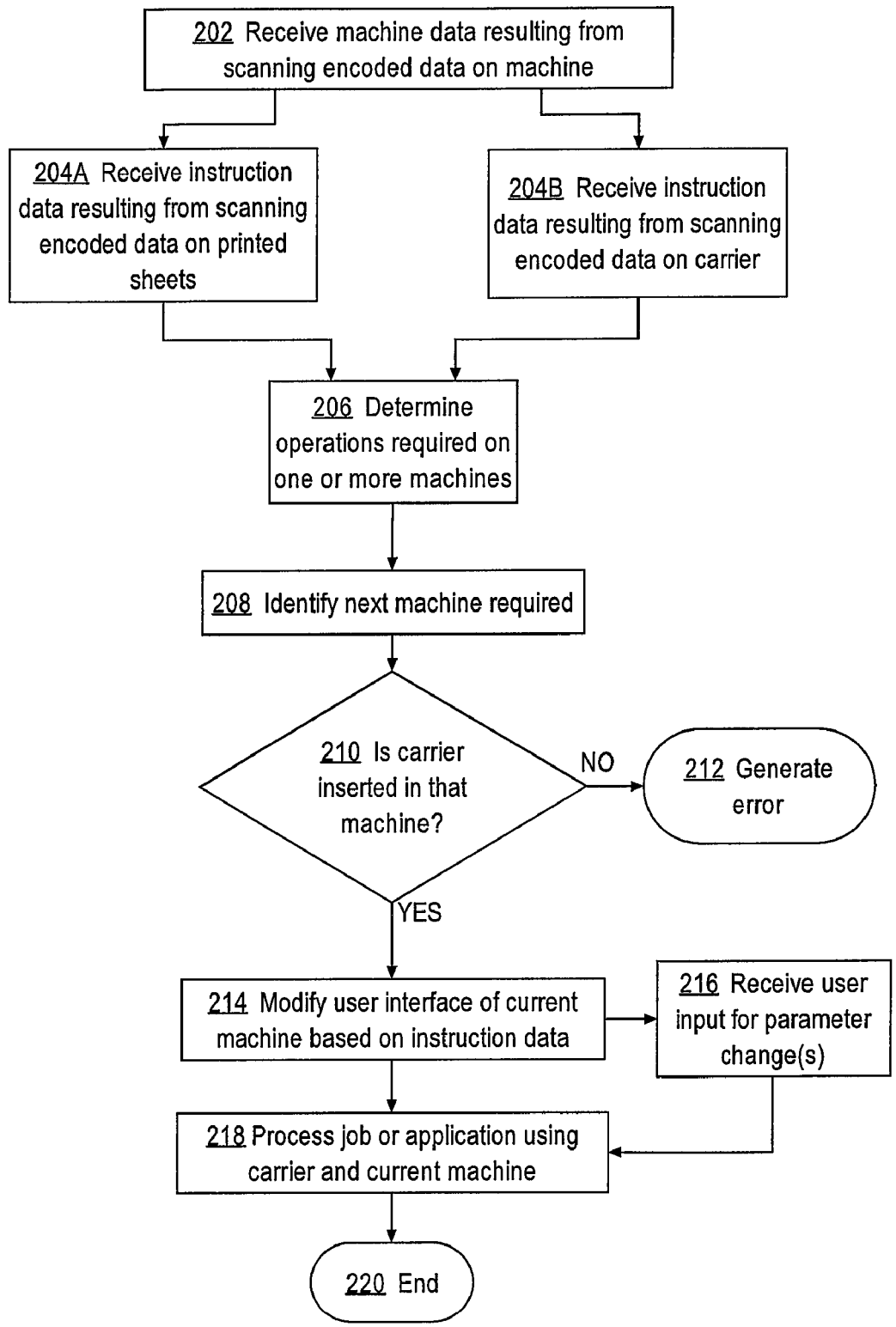
FIG. 2 illustrates controlling a document processing workflow.

FIG. 2 illustrates controlling a document processing workflow.

Step 202 comprises receiving machine data resulting from scanning encoded data on a machine. For example, an encoding 150 on first machine 102 is scanned using reader 120. As a result, logic in the first machine 102 becomes aware of the identity of the first machine. In some embodiments, the logic in the first machine 102 is pre-programmed with identity information, so that step 202 can be omitted.

Step 204A comprises receiving instruction data resulting from scanning encoded data on one or more printed sheets. For example, an encoding 170 on sheets 172 is scanned using reader 120. As a result, logic in the first machine 102 becomes aware of an operation to be performed on the sheets 172. For example, step 204A may involve reading a barcode on a printed sheet using a barcode reader, which causes recognizing a job number or other unique identifier that is represented in the barcode. The reader or the workflow logic 180 then sends a request to one of the computers 132, 134, 136 and provides the unique identifier. Reading instruction data by scanning, as in FIG. 2 step 204A, may be equivalent to selecting the LOAD button among action buttons 412, described further below in connection with FIG. 3B, FIG. 4.

Additionally or alternatively, step 204B comprises receiving instruction data resulting from scanning encoded data on a carrier. For example, encoding 160 on media carrier 110 is scanned using reader 120. As a result, logic in the first machine 102 becomes aware of the operation to be performed on the sheets 172 that are in the media carrier 110.

Step 206 comprises determining operations required on one or more machines. For example, in response to receiving the machine data and instruction data at steps 202, 204A, 204B, logic in the first machine 102 interprets the data and determines what specific machine operations the data represent. Step 206 may comprise parsing, mapping, using lookup tables, or other determinations. Alternatively, in the barcode example given above, the application production logic uses the unique identifier as a key to read a record that contains programming instructions for a machine associated with the reader, and provides the programming instructions to that machine over the network 130. As a result, the machine automatically becomes programmed with a correct configuration, parameter values and other instructions for generating a printed application, merely by an operator causing the encoded data to be read.

Step 208 comprises determining the next machine required to perform the operations identified in the received instruction data. For example, the instruction data may comprise using a stapler for applying two staples to each set of documents received from the media carrier and applying the staples at the left margin, followed by punching three holes in the left margin area using a puncher or other finishing machine. In this example, step 208 comprises determining that a stapler or staple finisher is the next machine required to perform an operation.

Step 210 comprises determining whether the media carrier is inserted in the machine that was determined at step 208. For example, logic in the first machine 102 tests whether the machine data matches information identifying the next machine required to perform the machine operations. Thus, if the instruction data indicates that the next machine required is a stapler, and the carrier 110 is inserted into first machine 102 which is not a stapler, then step 210 would have a negative result. Conversely, if the first machine 102 is a stapler or has stapling capability, then step 210 would have a positive result. The use of a media carrier is optional and certain embodiments may not implement step 210 and related steps.

If step 210 is negative, so that the media carrier is not inserted in the next machine required, then control transfers to step 212 in which an error is generated. Step 212 may comprise issuing an error message at a display on first machine 102, generating an audible sound, issuing an error message on reader 120, sending a log message into network 130 for consumption at a management station, recording a log message in first machine 102, or other means for generating an error. Step 212 may comprise any process, means or mechanism by which a user, machine or system is informed that the media carrier is not inserted in the next machine required.

If step 210 is positive, so that the media carrier is inserted in the next machine required, then control transfers to step 214, which comprises modifying a user interface of the current machine based on the instruction data. In some embodiments, step 214 is not performed or skipped. As one example, in step 214 the first machine 102 modifies information or options displayed in a user interface of the first machine based on the instruction data. For example, the instruction data may specify performing stapling but prompting the user to enter the number and position of the staples. In response, logic in first machine 102 displays a prompt message in the user interface and waits for user input. In step 216, user input for one or more parameter changes is received. Steps 214, 216 may be repeated as necessary to enable the current machine to receive any other data necessary to properly perform a machine operation.

Step 218 comprises processing a job or application using the media carrier and the current machine. For example, step 218 comprises actually performing the operations specified in the instruction data on the media that is in the media carrier. Step 218 may comprise any appropriate machine operations including finishing, duplication, scanning, etc. The process of FIG. 2 is complete at step 220.

Optionally, as part of step 218 or in a separate step that is performed after step 218, the instruction data is modified to reflect the current state of the process or prior operations. For example, during or after a first machine operation performed in the first machine 102, the logic generates one or more page images, or instructions in a page description language or page control language, which encode operational instructions in printable pages or printable form. The operational instructions encode operations to be performed at the second machine 104 or subsequent machines. In an embodiment, the instructions when printed are encoded using bar codes, but any other form of encoded, machine-readable indicia may be used. The page images are then printed at the first machine 102 or on a printer that is coupled to network 130 or to one of the computers 132, 134, 136. Additionally or alternatively, the updated operational instructions may be sent from one machine to another machine through network 130.

Further, as part of step 220 or in a separate step, a media carrier comprising the printed images is transferred to another machine, such as machine 104, 106, or used again in the same first machine 102. For example, machine 102 may perform printing and machine 104 may perform finishing. Step 220 may comprise transferring sheets from the printed output tray of a first machine to the finisher input source of a second machine, e.g., for finishers that do not normally have an in-line connection to a printer. Additionally or alternatively, media in the media carrier may undergo multiple-pass workflow through a finishing device and multiple physical finishing operations using the same machine or different machines.

Figure 3A:
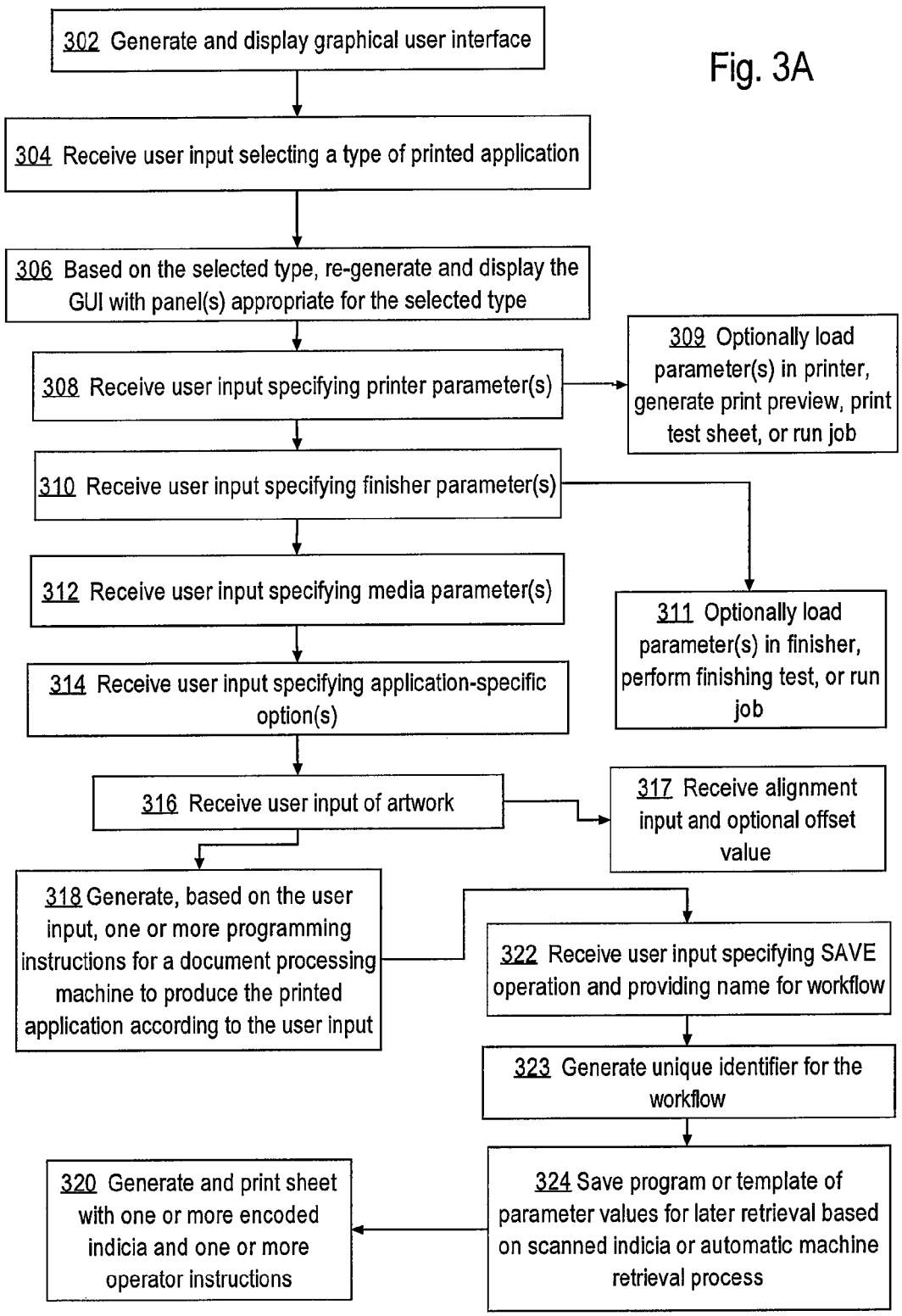
FIG. 3A illustrates generating a programmed workflow and printed instructions for processing sheets using the application production logic.
Figure 4:
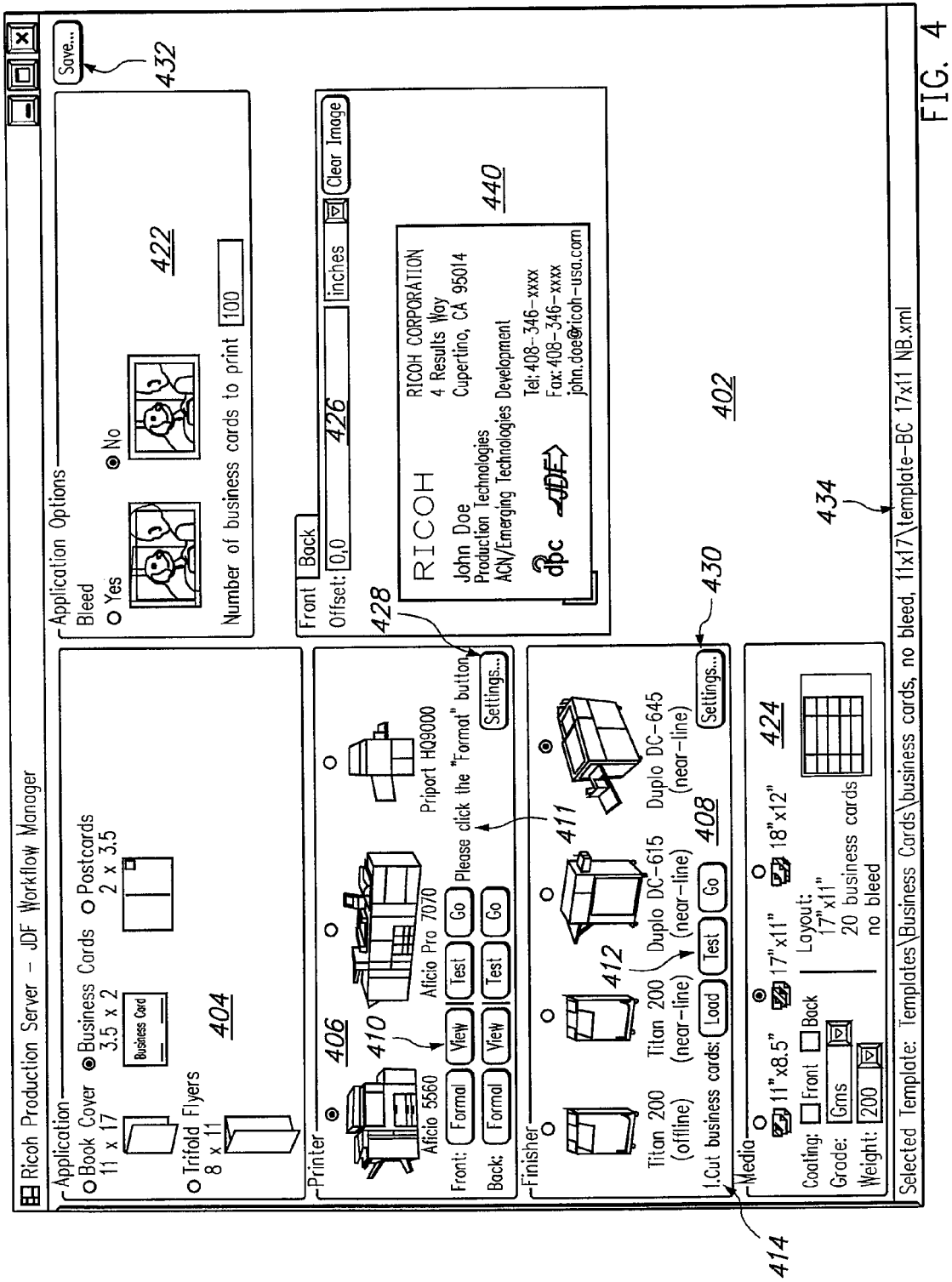
FIG. 4 illustrates a graphical user interface for controlling a document processing workflow.

FIG. 3A illustrates generating a programmed workflow and printed instructions for processing sheets using the application production logic. In step 302, a graphical user interface is generated and displayed. In an embodiment, application production logic 190 generates and displays a GUI having the form shown in FIG. 4. In other embodiments, a GUI may comprise panels, regions, GUI widgets, parameters, and values other than as shown in FIG. 4. For example, a GUI may allow a user to input parameter values for document processing machines other than the printers and finishers shown in FIG. 4 and for other types of machines, and may allow a user to select printed application types other than those shown in FIG. 4.

In step 304, user input selecting a type of application is received. For example, in FIG. 4 a GUI 402 comprises a region 404 having a plurality of radio buttons, each associated with a different printed application type including book cover, business cards, postcards, and trifold flyers. Step 304 may be implemented by application production logic 190 receiving user input in response to a user moving a pointing device to cause a cursor to select a radio button identifying a type of printed application.

In step 306, based on the selected printed application type, the GUI is re-generated and displayed with panels that are appropriate for the selected type. For example, when the selected application type is Business Card, then an application options region 422 of GUI 402 displays a Bleed option and a text box that allows a user to input a number of business cards to print. When the selected application type is different, then the application production logic 190 re-generates the GUI 402 so that the application options region 422 displays different data, GUI widgets, or data input options appropriate for the selected application type.

In step 308, user input specifying one or more printer parameters is received. For example, the application production logic 190 received user input selecting or specifying parameters in Printer region 406 of GUI 402. In an embodiment, Printer region 406 comprises radio buttons that allow a user to select a particular printing device. Region 406 may comprise a Settings button 428 which, when selected, allows a user to enter or select parameter values specific to the selected type of printing device. In an embodiment, selecting the Settings button 428 causes the application production logic 190 to display a GUI panel that receives user input for particular printer settings.

Region 406 also may comprise a set of action buttons 410 and a prompt message 411. The prompt message 411 informs a user about the next operation that is appropriate to accomplish production of a printed application. In an embodiment, action buttons 410 comprise FORMAT, VIEW, TEST, and GO buttons, but other actions may be provided in other embodiments. The action buttons 410, when selected, cause the application production logic 190 to format a printed application, generate a print preview on the display device, perform a test print, or start printing the application.

Formatting a printed application may comprise generating data for printing a page based on the artwork of image region 440 (discussed below) and compatible with finisher parameters that have been selected in region 408 (discussed below); thus, formatting involves preparing a printable image that takes into account the selected printer, finisher, and artwork. Generating a print preview may comprise visually displaying an image of a sheet with encoded indicia and operator instructions such as that of FIG. 5. As shown in FIG. 3A, step 309, the application production logic 190 may optionally load parameter values in the printer, generate a print preview, print a test sheet, or a run a job. Loading parameter values may comprise sending the parameter values in instructions or commands over a network to the printer or another machine. Alternatively, the GO button can cause printing or displaying instructions in a display or on a printed sheet for later use.

In step 310 of FIG. 3A, user input specifying one or more finisher parameters is received. For example, application production logic 190 may receive a selection of a finisher type using radio buttons in a Finisher region 408 of GUI 402. Region 408 may comprise a Settings button 430 which, when selected, allows a user to enter or select parameter values specific to the selected type of finisher. In an embodiment, selecting the Settings button 430 causes the application production logic 190 to display a GUI panel that receives user input for particular finisher settings.

Region 408 also may comprise a set of action buttons 412 and a prompt message 414. The prompt message 414 informs a user about the next operation that will occur with the selected finishing machine for the selected type of printed application. In an embodiment, action buttons 412 comprise LOAD, TEST, and GO buttons, but other actions may be provided in other embodiments. The action buttons 412, when selected, cause the application production logic 190 to generate and load parameter values in a finisher, perform a test finishing operation, or start finishing the entire application. Loading parameter values may comprise sending the parameter values in instructions or commands over a network to the finisher or another machine. As shown in FIG. 3A, step 311, the application production logic 190 may optionally load parameter values in the finisher, perform a finishing test, or a run a job. Alternatively, the GO button can cause printing or displaying instructions in a display or on a printed sheet for later use.

In step 312, one or more media parameters are received. For example, the application production logic 190 may receive one or more parameter values from user input in a Media region 424 of GUI 402. In an embodiment, Media region 424 allows a user to select a page size and a coating type, grade, and weight for paper that will be used. In an embodiment, Media region 424 displays a set of page sizes that are compatible with the selected printing machine and finishing machine that are identified by the user selections in Printer region 406 and Finisher region 408. The application production logic 190 may re-generate the Media region 424 to show different compatible page sizes if selections in the Printer region 406 and Finisher region 408 change. Values that a user provides in the Media region 424 may affect the generation of programming instructions for the selected printing machine or finishing machine; for example, of the a selected Weight menu item may specify programming instructions that might cause the printing machine to use a specific fusing temperature.

In an embodiment, application production logic 190 is configured to display, in Media region 424 or another region of GUI 402, a reduced-size schematic layout of the printed application as it would be produced when the selected page size is used. The layout image may assist a user in comparing the amount of waste paper involved when different page sizes are selected so that minimum waste may be selected or other optimizations may be performed.

In step 314, one or more application-specific options are received. For example, in GUI 402 a user may provide application-specific parameter values in Application Options region 422. The specific user input and parameter values that the application production logic 190 receives will vary depending on the application.

In step 316, user input of artwork is received. In an embodiment, application production logic 190 generates an image region 440 in GUI 402 that allows a user to drag and drop an image for printing into the region; when the user "drops" the image, the image data is received by the application production logic and associated with the printed application. In the example of FIG. 4, the selected application type ("Business Cards") only supports an image on the front of the printed application, but other kinds of business cards and other application types may have images on the back of the printed sheet. In an embodiment, image region 440 includes a Front tab and a Back tab that allow a user to separately drag and drop in images for both the front and back of the sheet.

In an embodiment, image region 440 prompts the user to drag and align the image against a marker shown within the image region. Additionally or alternatively, image region 440 comprises an offset value box 426 that allows a user to specify a position offset for the image as an alternative to dragging the image to an offset position. An offset position allows for bleed, and other effects. Thus, in step 317, alignment input and an optional offset value may be received.

In step 318, based on the first data, one or more programming instructions are generated for a document processing machine to produce the printed application according to the received parameters, the application-specific options, and the selected application type. For example, the application production logic 190 transforms the parameter values, options, application type, and other received user input into one or more sets of programming instructions in a format or language that will be understood by the selected printer and finisher.

Figure 5B:
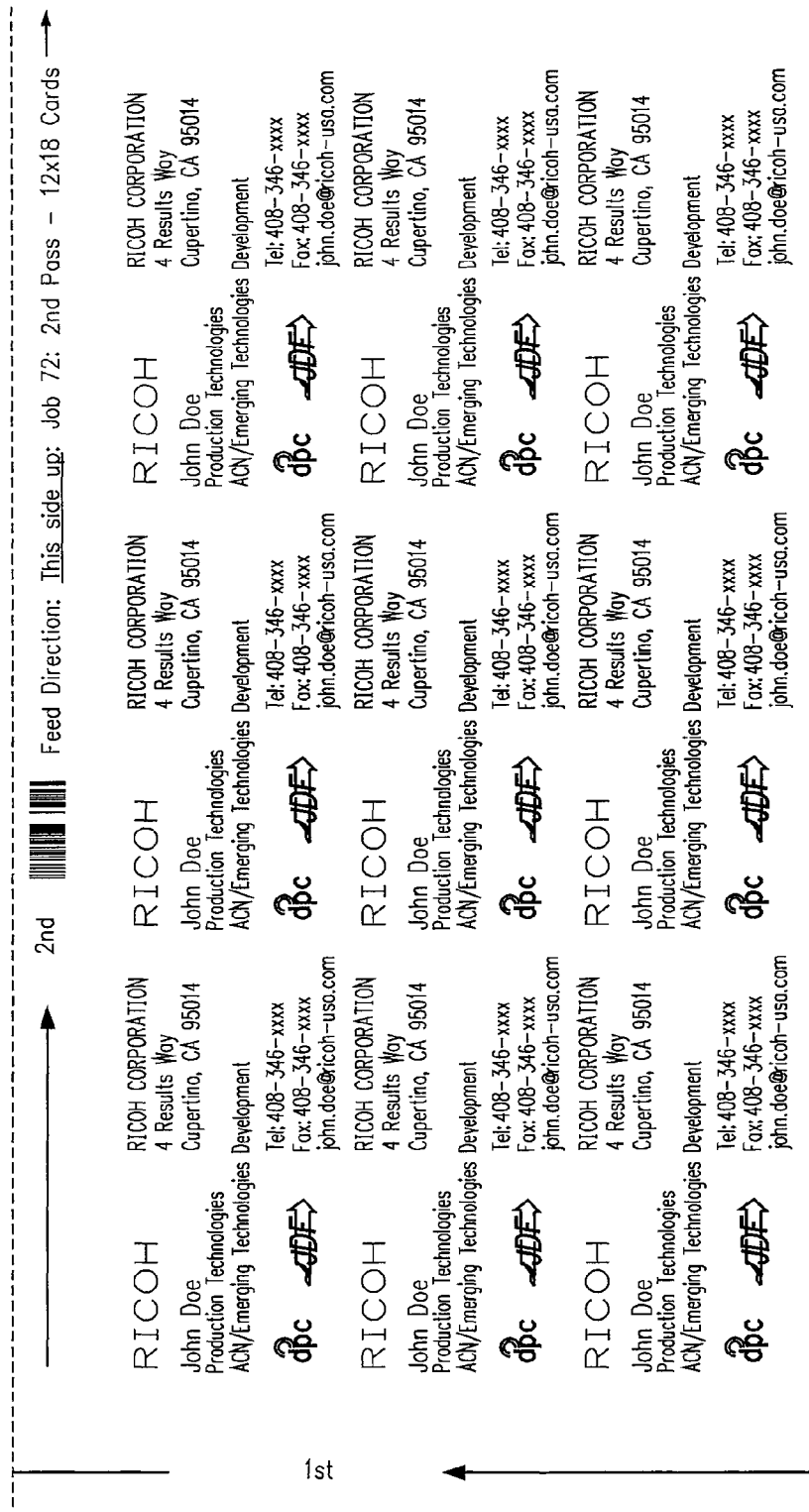
FIG. 5 illustrates an example printed sheet bearing encoded indicia and instruction data for a two-pass printed application comprising business cards.
Figure 5:
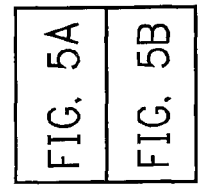
Figure 5A:
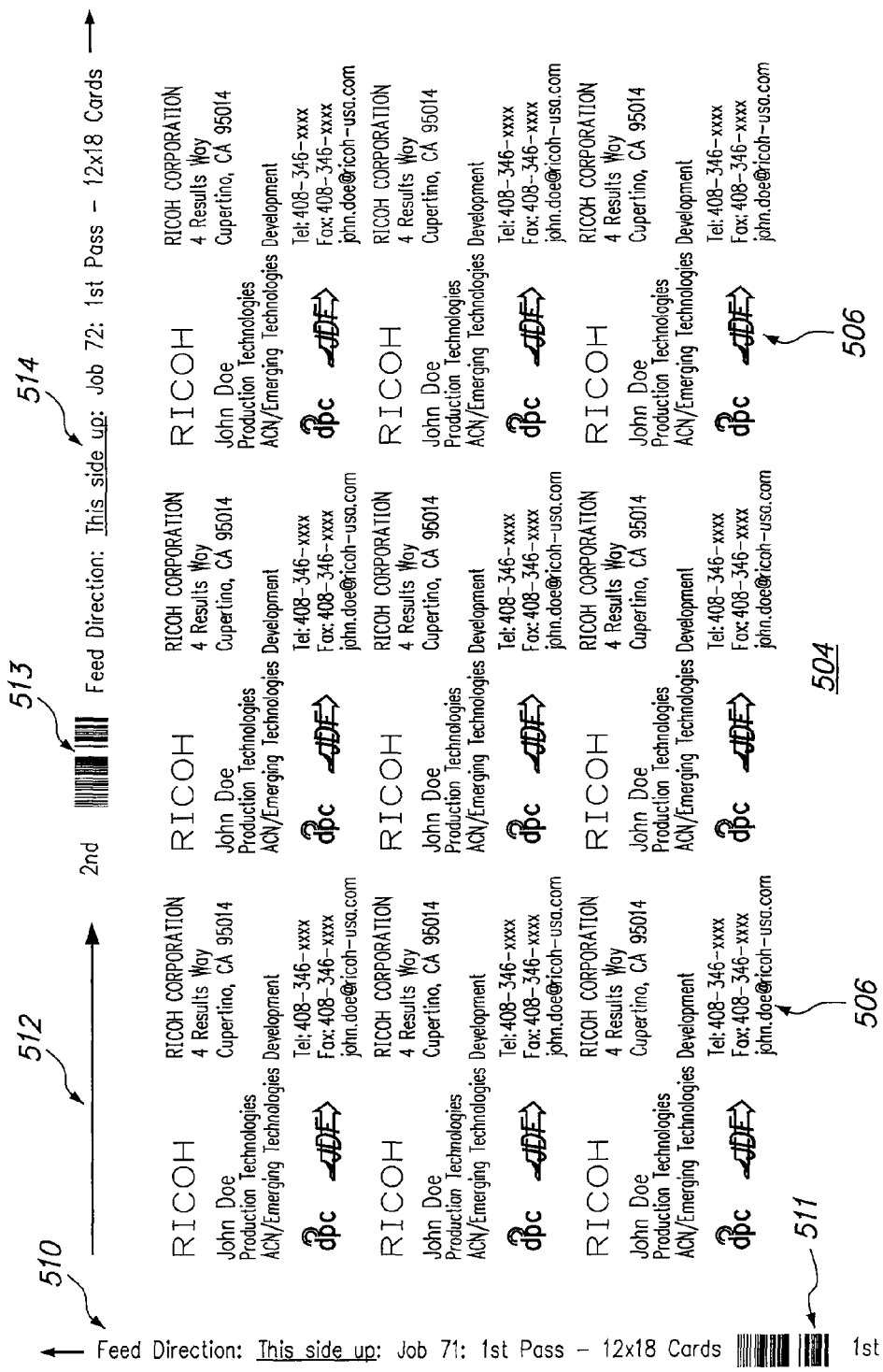

In step 320, based on all the received parameters, a sheet is generated and printed having one or more encoded indicia and one or more operator instructions. The encoded indicia, when read at a reader on a machine or associated with a machine, cause the machine to be programmed with parameter values for performing one or more operations to produce the printed application. The operator instructions comprise human-readable instructions that guide a machine operator in how to insert paper into one or more machines for successive steps in producing the printed application. FIG. 5, described further below, provides an example of a printed sheet that includes encoded indicia, operator instructions, and printed images. In other embodiments, the sheet printed at step 320 omits printed images and includes only encoded indicia and operator instructions.

In step 322, user input specifying a SAVE operation and providing a name for a workflow is received. For example, application production logic 190 receives input indicating selection of the SAVE button 432 of FIG. 4; in response, the application production logic generates and displays a pop-up window that prompts the user to enter a name for the workflow.

In step 323, a unique identifier is generated to represent the programmed workflow. In an embodiment, the unique identifier is a number or an alphanumeric value that can be represented in a barcode symbology. The unique identifier may comprise a job number, or the combination of a job number and a finisher number.

In step 324, all the parameter values that have been programmed through user input, such as through the GUI of FIG. 4, are saved in the form of a program or template. In an embodiment, application production logic 190 saves a record, which associates the received user input, the programming instructions generated at step 318, and the unique identifier, in storage 142. In an embodiment, saving programmed parameter values enables a machine or reader to later retrieve the values in response to reading indicia on a printed sheet, or through an automatic machine retrieval process, as further described below. For example, reading a barcode on a printed sheet using a barcode reader causes recognizing the unique identifier, which is then used as a key to read the record, extract the programming instructions, and provide the programming instructions to a machine associated with the barcode reader.

In an embodiment, the application production logic is configured to retrieve one or more units of accuracy of the one or more finishing machines, to transform one or more print position values of the printed application into modified print position values using the retrieved units of accuracy, and to print, on one or more sheets of the paper, one or more printed images of the printed application and the one or more operational instructions at the modified print position values. Thus, the logic is configured to use units of measurement based on the least precise values of all machines involved in a job. For example, a printer can typically position a printed dot on a page in 1/600 or 1/1200 inch locations. However, most finishing machines are mechanical or hydraulic, and capable of less precise movement, for example 1/60 of an inch. In an embodiment, once the user has selected a particular combination of printing machine and finishing machine, the data for a printed application is arranged on a page for printing, and associated finishing programming data is generated, using the units of the least precise machine that has been selected (e.g., 1/60 of an inch). Otherwise, round-off error could cause problems when finishing the sheet. Unit conversion and arrangement of images on a page for printing may occur when a user has selected a FORMAT, VIEW, TEST or GO button as further described herein in the context of FIG. 4.

In addition, finishing machines that provide multiple functions, such as the Duplo DC-645, also have more programming restrictions; for example, such machines can only cut between 5 mm and 40 mm off the edge of a sheet. Accordingly, in an embodiment, the workflow logic 180 in a machine can retrieve from storage other parameter values reflecting limitations of another machine and can modify the layout of a printed image based on the limitations of the selected finishing machine.

FIG. 3B illustrates controlling a document processing workflow using a template.

Step 352 comprises displaying one or more available templates and a summary of operations associated with the templates. For example, logic in machine 102, or in one of the computers 132, 134, 136, determines from the storage system 142 a list of one or more available templates 140 and displays the list in a user interface of machine 102 or the computer. In an embodiment, the logic reads a description for each of the templates, obtains metadata describing the operations represented in the template, and displays a summary of the operations. For example, one template might be named "Create Literary Magazine.TPL," and the summary of its operations might be: "Print and Finishes an 8½×11 duplex literary magazine; print and finishes (e.g. trim and score) the cover; applies perfect binding adhesive on left edge; requires ½" gutter." The template comprises machine programming instructions that implement the specified operations. The metadata may be obtained from a template directly or may be contained in a separate description file. Each of the templates reflects known correct programming instructions and parameter values for specified combinations of printing machines and finishing machines. Thus, the templates are typically pre-tested on specified combinations of machines before deployment.

Step 354 comprises receiving user input selecting a template. For example, the logic receives a user selection of one of the templates through a user interface of the machine 102 or one of the computers 132, 134, 136.

Step 356 comprises retrieving the selected template. For example, if the logic did not read the entire template at step 352, then in step 356 the logic retrieves the entire selected template 140 from storage system 142.

Step 358 comprises providing programming instructions from the selected template to one or more machines that are identified in the template. For example, the logic reads the selected template and extracts machine programming instructions from the template that encode operational instructions that are understandable to a printing machine and finishing machine and when execute cause producing the printed application associated with the template.

Step 360 comprises causing the printed application to be produced using the machines identified in or associated with the template. For example, the logic causes the pages to be printed on one of the machines 102, 104, 106, or on a printer that is attached to the network 130 or to one of the computers 132, 134, 136. Normally printed pages are then moved manually to a finishing machine, which has been loaded with programming instructions at step 358, and an operator starts the finishing machine to complete producing the printed application. However, the approach herein offers the benefit of automatically programming both the printing machine and finishing machine with parameter values that can implement a particular printed application, greatly reducing the amount of time involved in producing the application and reducing the chance for operator error in entering parameter values or setting up machines.

In an embodiment, FIG. 3 ends after step 360 at step 362. Alternatively, after step 310 control transfers to step 204A of FIG. 2. The pages that were printed at step 310 become the printed sheets referenced in step 204A. The pages that were printed at step 310 can be scanned immediately using reader 120 to provide automated instructions to any of machines 102, 104, 106.

As one result, a template 140 can drive consistently correct finishing operations on a sequence of machines and ensure that correct media are used, and that correct machine operations are performed on the correct machines in the correct sequence. In one embodiment, an operator places the media carrier 110 in the wrong machine, or in the wrong sequence, and then an alarm is generated to warn the operator and prevent performing an incorrect operation.

Therefore, undesirable results can be avoided; for example, an operator can put aside a media carrier 110 for a period of time, then return to the job or application, scan the encoding 170 on the printed sheets 172, and have confidence that the sheets in the media carrier are being provided to the correct next machine in an operational sequence. Further, as an example, if a carrier is presented to a cutter, and instructions on an RFID tag of the carrier or indicia on printed sheets in the carrier indicate that the next operation is coating, then the logic can generate an error message or generate a warning. Accordingly, complex production printing and finishing jobs may be performed with consistent accuracy because the logic in the machines or computers is informed which machine is in use and which operations are to be performed using the media in the media carrier. Further, the overall workflow involved in preparing an application is controlled.

As noted above, FIG. 4 illustrates a graphical user interface for controlling a document processing workflow, and additional features of various embodiments are now described.

In the example of FIG. 4, the business cards application has been selected. Each application may have additional options that can be specified. For example, for business cards, the quantity text box 420 enables a user to enter a number of business cards to print. A "bleed" radio button enables a user to specify whether the business card data requires a bleed area to cut into. Image region 440 provides an area for a user to "drag and drop" print application data in the form of a file such as a PDF document. The system displays the data in region 440 and allows for an offset position to be changed. The "Back" tab of region 440 can be used to enter the print application data for the back side of the printed piece.

A media region 424 provides radio buttons for selecting a size of pages and related options. Other attributes of the media that can be specified include the paper weight as well as whether the media has a coating on the front side or the back side, may be selected using widgets in region 424. The resulting layout of the print application for the selected media size and finishing device is also displayed.

In the example of FIG. 4, a printer region 406 comprises radio buttons to select a target printer, graphical buttons for selecting a view of a front or back of the printed sheets, performing a test print, or printing all requested sheets. When the View button is selected, corresponding graphical images are displayed in a new window that correspond to a print-ready view of the sheet to be printed, an example of which is shown in FIG. 5.

In the example of FIG. 4, a finisher region 408 comprises graphical buttons for implementing a finishing operation. In the example of FIG. 4, in response to the Application selected in region 404, the Printer selected in region 406, and the Media selected in region 426, the required finishing steps are automatically indicated in finisher region 408.

In the example of FIG. 4, finisher region 408 identifies a first finishing operation as "1. Cut business cards:". In an embodiment, finisher region 408 can display any number of other finishing operations, and the contents of the graphical user interface are adjusted or modified based on the received instruction data that was obtained in FIG. 2. Thus, the layout of the GUI can accommodate multiple future steps in a workflow.

A Save button 432 is provided. In response to receiving user input selecting the Save button 432, the programmed workflow consisting of all parameter values selected in FIG. 4 and any associated artwork are saved in storage of one of the computers 132, 134, 136 or in networked storage 142. Saving a workflow enables the workflow to be opened at a future time on any of the computers 132, 134, 136 and viewed or modified. Saving a workflow also enables the programming of the workflow, represented in the parameter values, to be accessed from other processes and systems while not loaded in the GUI. For example, a barcode reader that scans the printed page of the application, or that scans one of the machines specified in the workflow, can cause a processor in the associated machine to retrieve the programmed parameter values from storage and apply the parameter values to the associated machine.

In an embodiment, a graphical user interface such as that of FIG. 4 provides widgets which when selected enable a user to adjust document properties to accommodate specific kinds of finishing. For example, embodiments may provide for image shifting, scaling, or re-flowing content to avoid staple or hole-punch locations, or shifting an image to account for binding requirements (e.g., making the center margin larger than outside sheet margin). Thus, the GUI enables a user to modify a document accommodate finishing device limitations. In an embodiment, a document can be re-flowed to accommodate finishing.

FIG. 5 illustrates an example printed sheet bearing encoded indicia and instruction data for a two-pass printed application comprising business cards. In the example of FIG. 5, the front of a sheet 504 is to be printed with business cards. The sheet 504 comprises a plurality of business card images 506. The sheet 504 further comprises printed instruction data for two separate operations.

A first arrow 508 indicates a direction of travel of sheets into a machine for performing a first operation, such as performing a first cutting operation. The first arrow 508 also serves as a visual cue to an operator for orienting sheets in a media carrier and inserting the media carrier into an input path of a first machine such as a cutter. The use of a removable carrier is not required and the operator may respond to instructions by moving a stack of sheets alone.

The sheet 504 further comprises first printed indicia 511, which may comprise machine-readable instructions, and human-readable instructions 510. The indicia 511 may comprise a bar code, optically readable characters, or other printed symbols that a machine can read and interpret to determine what first operation to perform on the printed sheet. In an alternative embodiment, the indicia 511 may appear on a lead sheet, cover sheet or first sheet of a stack of sheets to be printed and need not appear on a sheet that bears printed material.

A second arrow 512 indicates a direction of travel of sheets into a machine for performing a second operation, such as performing a second cutting operation. The second arrow 512 also serves as a visual cue to an operator for orienting sheets in a media carrier and inserting the media carrier into an input path of a second machine.

The sheet 504 further comprises second printed indicia 513, which may comprise machine-readable instructions, and human-readable instructions 514. The indicia 513 may comprise a bar code, optically readable characters, or other printed symbols that a machine can read and interpret to determine what second operation to perform on the printed sheet. In an alternative embodiment, the indicia 513 may appear on a lead sheet, cover sheet or first sheet of a stack of sheets to be printed and need not appear on a sheet that bears printed material.

The indicia 511, 513 may relate to different operations involved in producing a completed printed application. One set of indicia may be associated with instructions that cause a finishing machine to partially finish a sheet and concurrently remove that set of indicia from the printed sheets, making it easier for the operator to process the sheets for the next operation. For example, in FIG. 5, a printed sheet 504 has two sets of indicia 511, 513 with arrows. When this sheet is fed into a cutting machine by an operator following instructions 510, the indicia 511 may cause the cutting machine to cut off indicia 511, and also cut the sheet in half, to deliver two sheets to the output tray. The resulting output sheets would only bear the second indicia 513 and associated operator instructions 514. The operator would then program the cutter using the second indicia 514 and would feed the sheets into the cutter again. In response, the cutter would cut each individual business card depicted in the sheet.

3.0 Plug-In Architecture

3.1 Overview of Plug-Ins

In an embodiment, application production logic 190 comprises a plug-in architecture that enables a user to add one or more components to the application production logic while it is executing, by dragging graphical representations of the components and dropping the graphical representations in specified locations of a graphical user interface provided by the application production logic.

In an embodiment, a data processing method or apparatus implement a process of adding functional components to a production printing system or printing management application. In an embodiment, the process discovers one or more plug-in components for the production printing system by first searching for a specified storage location. The process determines whether the storage location contains one or more plug-in components of specified types. The process determines, for each plug-in, one or more references to other components. The process minimally disables a plug-in, or part of a plug-in, which requires an unavailable referenced component or plug-in. Thus, the process expects plug-ins to refer to each other in particular ways and fails gracefully if a plug-in required by another plug-in cannot be found.

In an embodiment, the production printing system enables a user to use the plug-ins in novel ways. For example, using the currently-selected user interface, the user can select a print application from a list of discovered templates. The user can specify one or more files of artwork and/or variable data, as requested by the selected template. The user is then guided through the steps required by the selected template, and the devices required by that template, to format the artwork and data as required by the template and devices, send the printable image(s) to the printer(s) specified by the template, and move the printed paper from machine to machine as required.

In an embodiment, the components, also termed plug-ins, can refer to external elements of hardware, software, or both. Each component also can refer to other plug-ins, or classes of plug-ins, before being plugged in. Once a component is plugged in to the application production logic 190, components can identify and communicate with each other, with or without user guidance. A user can use the resulting system as if the components had always been part of the system. Furthermore, from the user's perspective, the system does not crash. If particular plug-ins cannot communicate with one other reliably, the particular plug-ins may be disabled, in whole or in part, and the user is provided with appropriate messages as appropriate.

Figure 7:
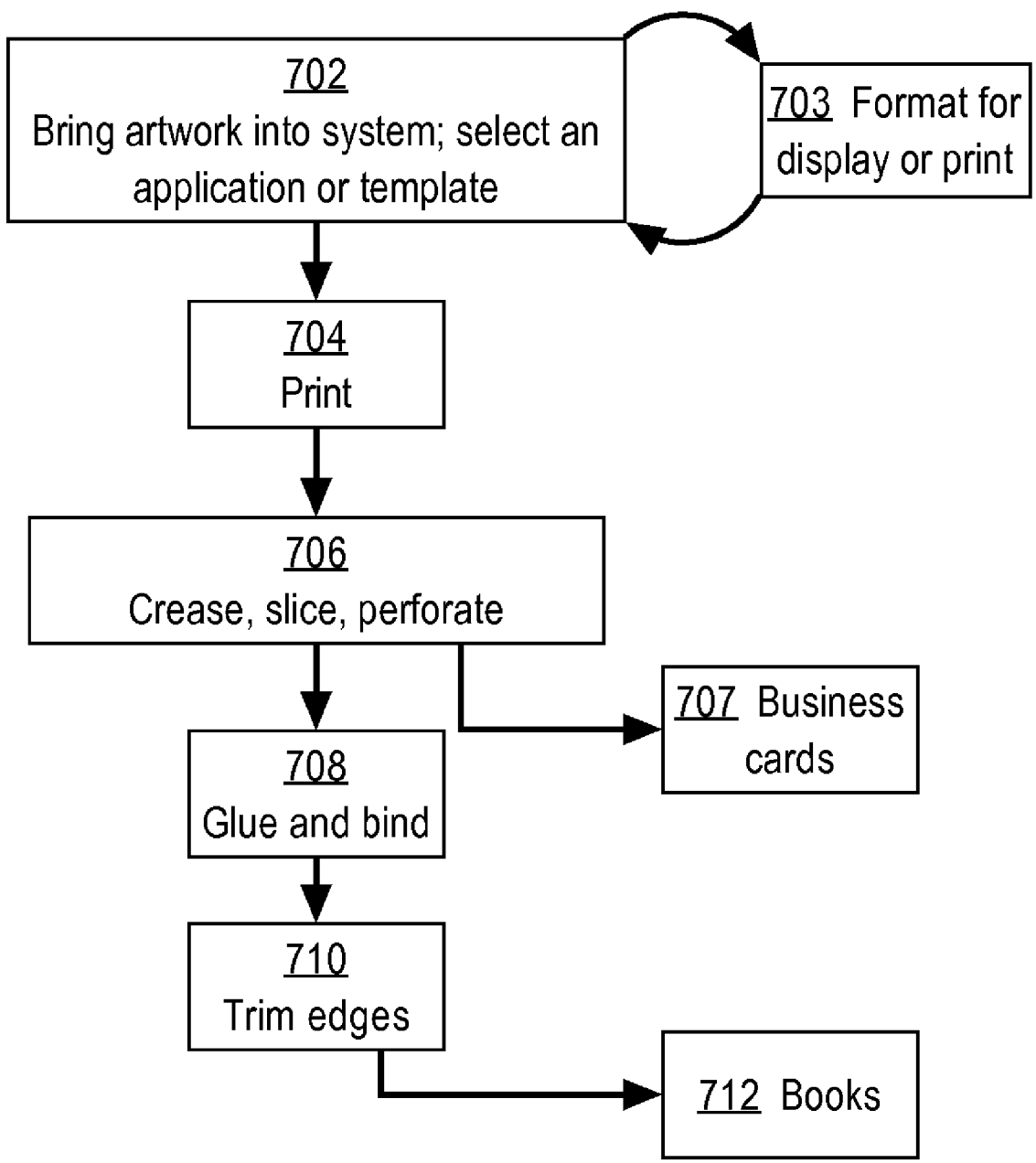
FIG. 7 illustrates a production printing process that can be automated in part using the application production logic with a plug-in architecture.

In an embodiment, the application production logic 190 is a computer program that enables a user to configure and print a document. FIG. 7 illustrates a production printing process that can be automated in part using the application production logic 190 with a plug-in architecture. In step 702, artwork is brought into a system, such as a host computer executing the application production logic 190. A user selects a printed application or template, such as business cards, books, etc. In step 703, the artwork is formatted for display or printing appropriate for the printed application.

In step 704, printing occurs. The artwork is printed according to the template using a printing machine. In step 706, the printed application may be creased, sliced, or perforated. At this point, particular printed applications such as business cards 707 may be complete. Alternatively, at step 708 the printed application may be glued and bound, and edges may be trimmed at step 710, resulting in completion of books at step 712.

In an embodiment, the application production logic 190 is configured to:
  display a graphical user interface;
  enable the user to supply a selection of artwork to be printed;
  enable the user to select a template indicating how to arrange the artwork on a piece of paper, or an application that contains placeholders for the artwork and/or additional text;
  format the artwork as needed by converting the artwork to a displayable format for display to the user and by converting the artwork to a high-quality, printable format that can be rendered onto paper;
  enable the user to configure the print job, specifying the number of copies to print, the type of paper to print it on, how to bind and trim the final product, and other parameters; and
  route the artwork and printing instructions to the printers and finishers required to produce the final application, enabling the user to monitor and control that process.

In an embodiment, the application production logic 190 is extensible and accepts plug-in logic or software modules for templates, applications, formatters, printers, finishers, and the user interface. As a result, the application production logic 190 is useful in a broad range of user environments. In an embodiment, the application production logic 190 comprises logic configured for connecting one plug-in to another, and making it possible for the user to provide the information required by a given template, within the context of the digital printing workflow broadly shown in FIG. 7.

In an embodiment, each of the plug-ins supports an internal API with which components of the application production logic 190 communicate. In another embodiment, JDF provides a messaging mechanism between components.

In various embodiments, plug-ins have various different formats. For example, a GUI plug-in may comprise a single, dynamically-loadable library (a .DLL file under Windows, or a .JAR file in Java) containing the appropriate user-interface elements. As another example, a plug-in representing a printer device may comprise a DLL for communicating with the printer, an XML file containing default printer parameters, and a graphic image file comprising an icon or other graphical representation of the printing device for use in the GUI. As another example, a template plug-in may comprise a folder containing an XML file describing how to lay out an application on a piece of paper, an icon illustrating that layout to the user, and a set of printable instructions to superimpose on the printed document.

In an embodiment, plug-ins refer to each other by the name of an object-oriented class, superclass, or interface that is expected to be able to provide a required ability. Several approaches may be used in various embodiments. Examples for templates, user interfaces, and printers are now described.

Figure 8:
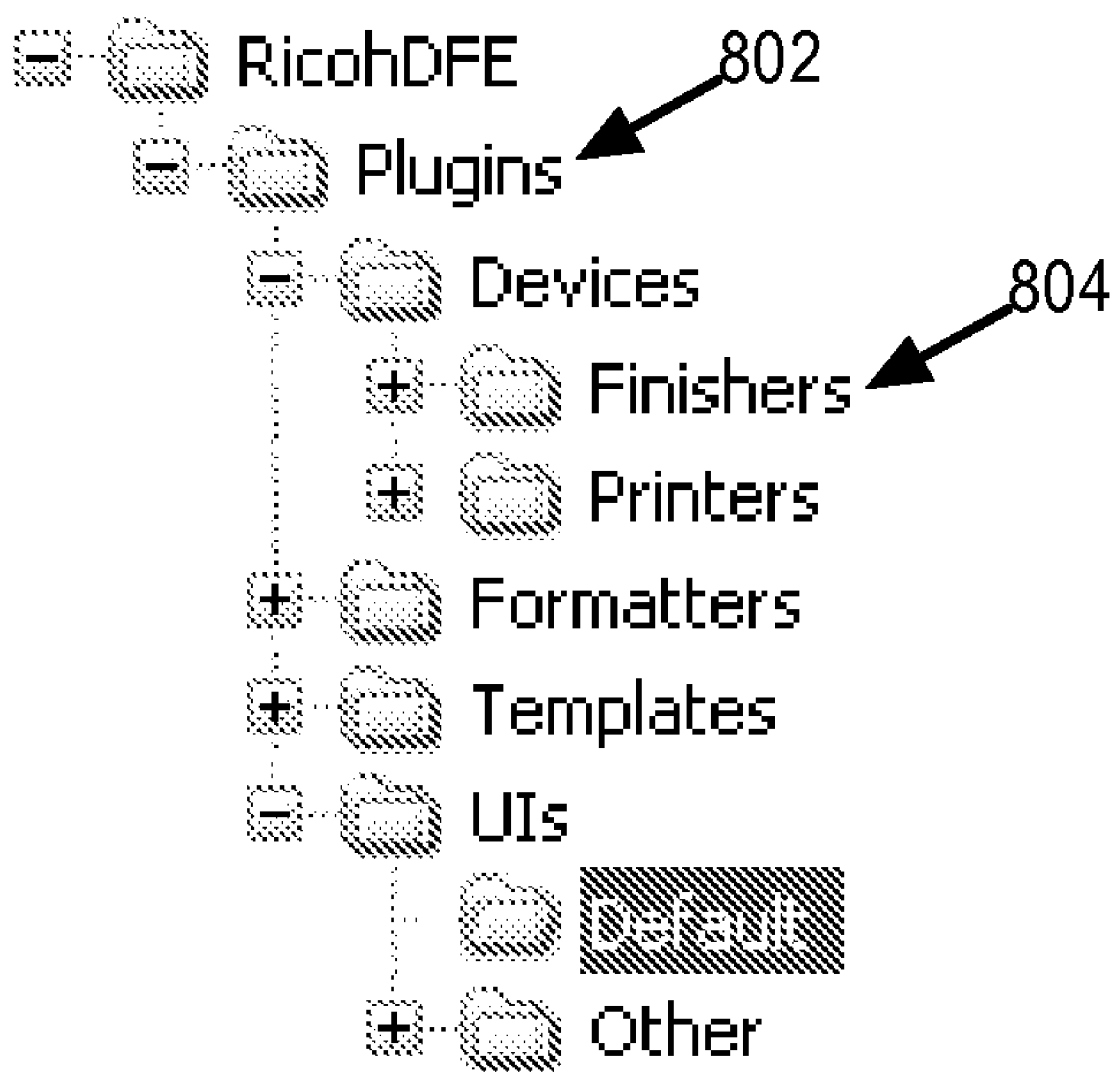
FIG. 8 illustrates an example Plugins folder with a hierarchy of other folders.

In an embodiment, the application production logic 190 displays a graphical user interface comprising a "Plugins" folder. FIG. 8 illustrates an example Plugins folder with a hierarchy of other folders. In an embodiment, the Plugins folder comprises one or more sub-folders 804 that store or hold plug-ins associated with printing applications, printers, finishers, or other elements of a production printing system.

In an embodiment, components are plugged into the application production logic 190 by dragging and dropping the components into the Plugins folder 802. In response, the application production logic 190 automatically detects components that are newly added to the Plugins folder and installs the components.

Figure 9:
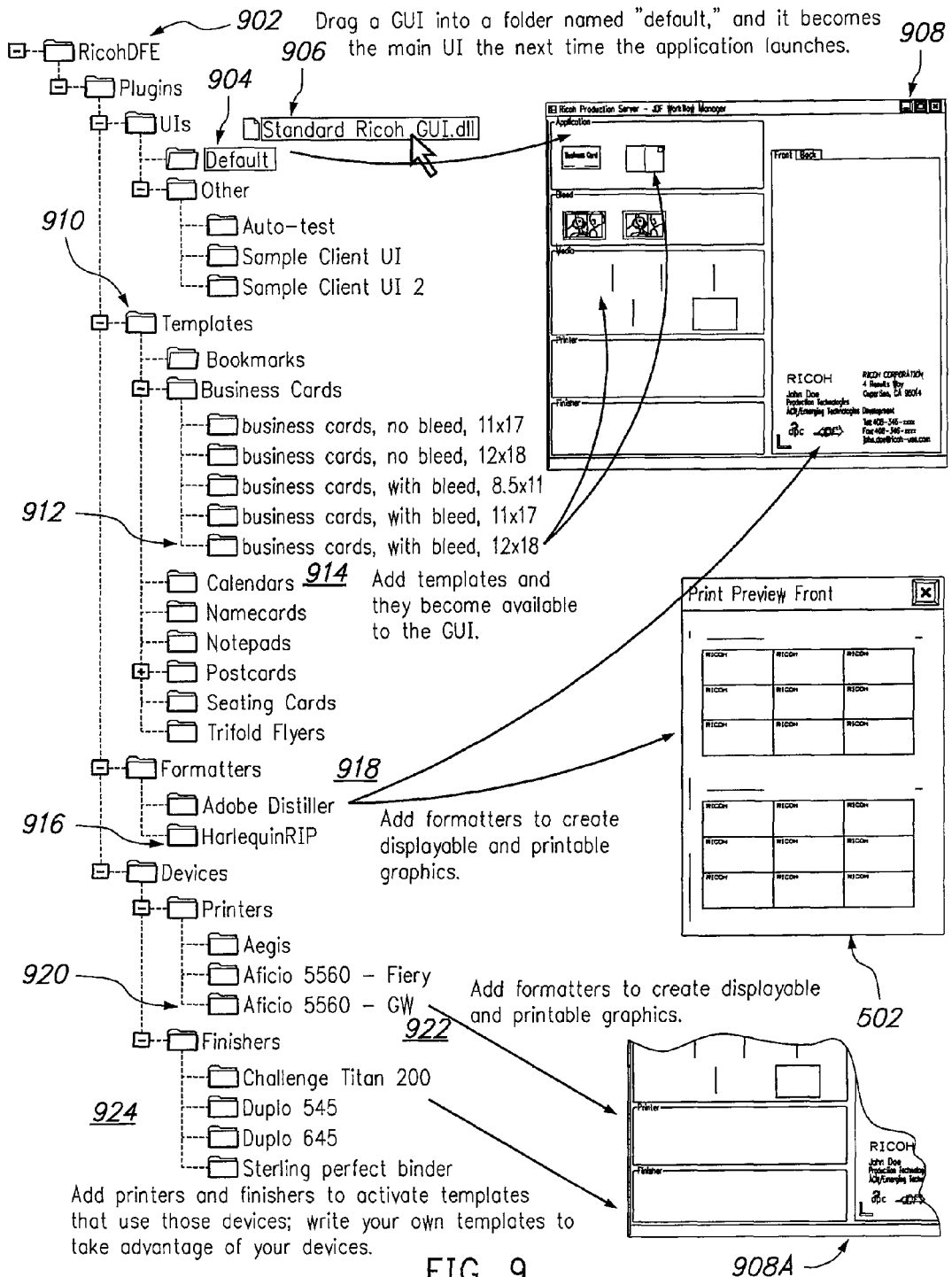
FIG. 9 illustrates representative ways to configure the application production logic by dropping plug-ins into an example Plugins folder.

FIG. 9 illustrates representative ways to configure the application production logic by dropping plug-ins into an example Plugins folder. In an embodiment, a print application management computer program maintains a folder hierarchy comprising a root folder 902 that contains one or more sub-folders of plug-ins. In an embodiment, a user creates a graphical user interface program plug-in 906 and drags and drops the GUI plug-in into a folder named /Plugins/UIs/Default. In response, the print application management computer program instantiates a graphical user interface 908 according to instructions in the GUI plug-in 906. Further, the GUI 908 becomes a default or main graphical user interface that is displayed automatically the next time that the print application management computer program launches.

In an embodiment, dragging and dropping a template into the plug-in folder hierarchy makes available in the GUI 908 a print application that is defined in the template. For example, in FIG. 9 as indicated at 912 a user has placed a template entitled "Business cards, with bleed, 12×18" into the Business Cards sub-folder of the Templates folder of the Plugins folder. In response, as indicated by arrows 914, the GUI 908 displays an icon representing the business cards application at the top of the GUI window and displays one or more GUI widgets associated with variables for the application, such as bleed on/off.

In an embodiment, dragging and dropping a Formatter plug-in into the plug-in folder hierarchy causes a formatter process or program to become available in the print application management computer program. For example, in FIG. 9 as indicated at 916 by a HarlequinRIP folder, a Harlequin brand Raster Image Processing (RIP) Formatter plug-in has been placed in the Formatters folder. (HARLEQUIN is a trademark or brand of GlobalGraphics Software Limited.) In response, the GUI 908 is reconfigured to permit the use of the HarlequinRIP Formatter for image formatting in the GUI and for generating instructions for printed images to appear in printed sheets 502.

In an embodiment, dragging and dropping a printer or finisher plug-in into the folder hierarchy causes the GUI 908 to reconfigure to show GUI widgets for accepting settings and variable values for the associated printer or finisher. For example, as seen in FIG. 9 at 920, a plug-in for the Ricoh 5560 printer has been dragged and dropped into the Printers folder of the folder hierarchy. In response, as indicated by arrow 922, the plug-in is integrated into the GUI 908 and selection buttons, number entry fields, and other GUI widgets appropriate for the printer appear in the GUI. Similarly, as indicated by arrow 924, dragging and dropping a plug-in for a Duplo finisher causes the GUI 908 to promptly include GUI widgets for selecting parameters relating to the use of the finisher.

Figure 10A:
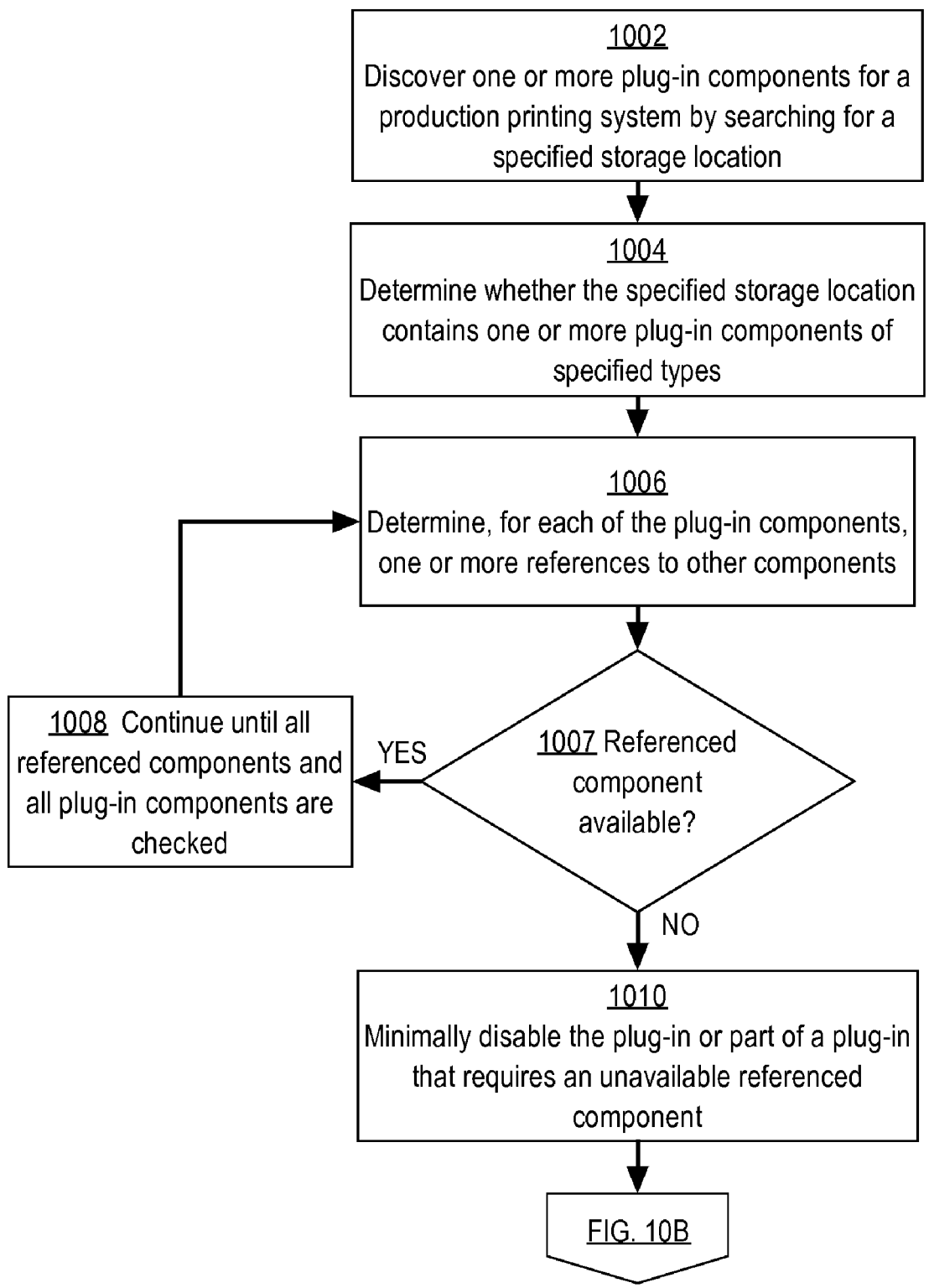
FIG. 10A illustrates a process of adding functional components to a production printing system.

FIG. 10A illustrates a process of adding functional components to a production printing system. In step 1002, the process discovers one or more plug-in components for a production printing system by first searching for a specified storage location. For example, the application production logic 190 searches for a folder with a specific name and location. Discovery may occur upon starting the production printing system, based on a timer, or in response to an event signal. For example, a folder hierarchy associated with a print application management computer program can be configured using operating system calls to generate an event when a new file is added to the folder hierarchy, and the print application management computer program can subscribe to events of that type. Discovery may be triggered in the print application management computer program by receiving the event.

In step 1004, the process determines whether the storage location contains one or more plug-in components of specified types. For example, the process can test whether the PlugIns folder contains one or more files of a type that indicates a plug-in.

In step 1006, the process determines for each plug-in, one or more references to other components. In step 1007, the process determines whether each referenced component is then-currently available in the folder hierarchy or in memory for the print application management computer program, so that the plug-in will operate correctly with all necessary referenced components. If each referenced component is available for a plug-in, as indicated in the YES branch of step 1007, then no special action is taken. As shown in step 1008, checking referenced components continues until all referenced components have been checked and until all plug-in components have been checked.

If a referenced component is missing, then in step 1010, the process minimally disables a plug-in, or part of a plug-in, which requires an unavailable referenced component or plug-in. Disabling a plug-in may comprise marking a table of plug-in data to indicate that a particular plug-in is inoperative or unavailable. Disabling a plug-in also may comprise generating an alert in the GUI 908 to inform a user that a particular printing device, finisher, or other capability of the print application management computer program is not available. Disabling a plug-in also may comprise reconfiguring the GUI 908 to remove, gray-out, or otherwise make unavailable one or more GUI widgets associated with the plug-in or associated devices.

As a result, production printing logic may be extended using user-specified plug-ins or other components that are added while the logic is executing. In certain embodiments, the process of FIG. 10A may continue with the other steps that are now described, but such steps are not required in other embodiments.

Figure 10B:
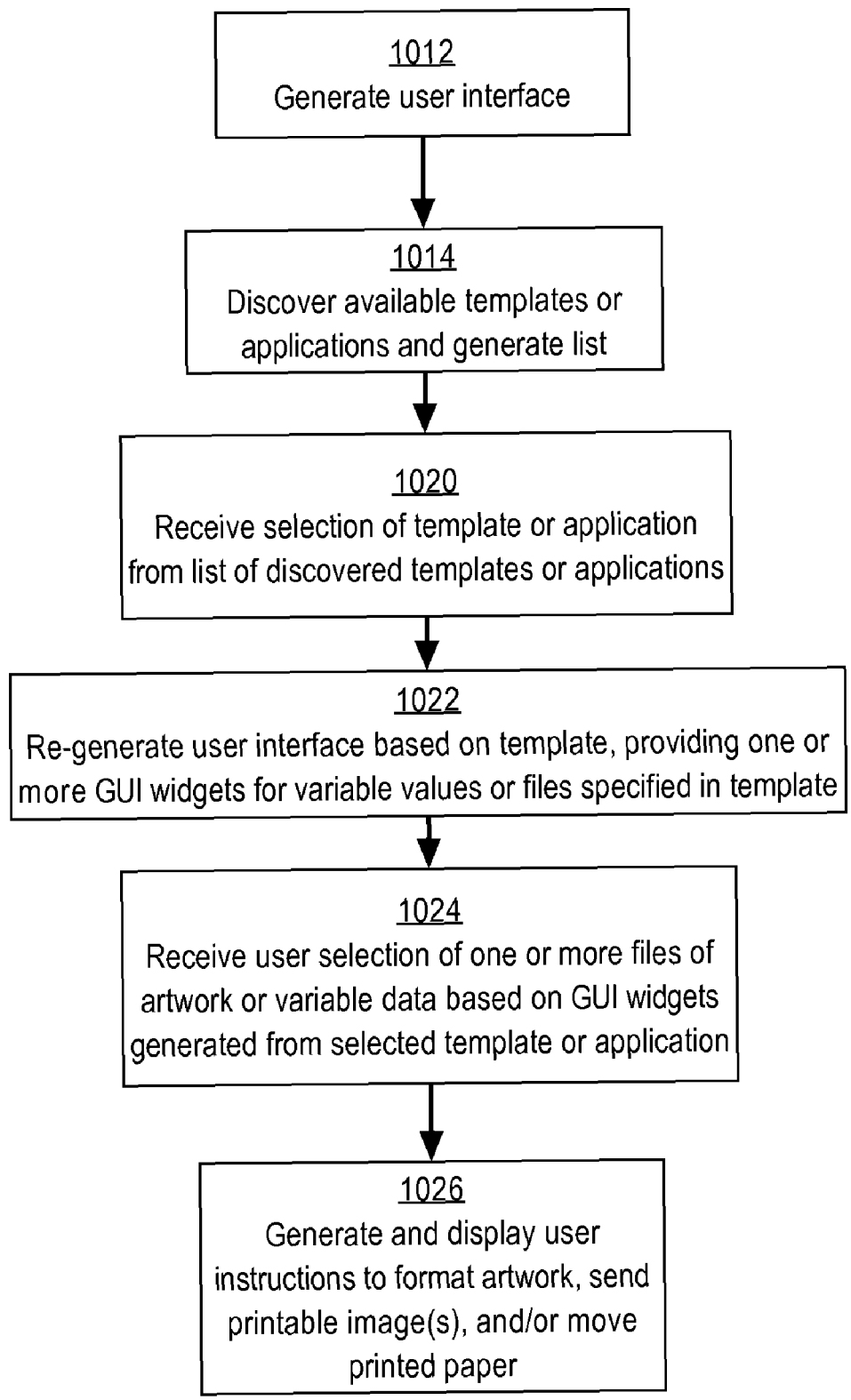
FIG. 10B illustrates a process of interacting with a template in a production printing system.
Figure 10C:
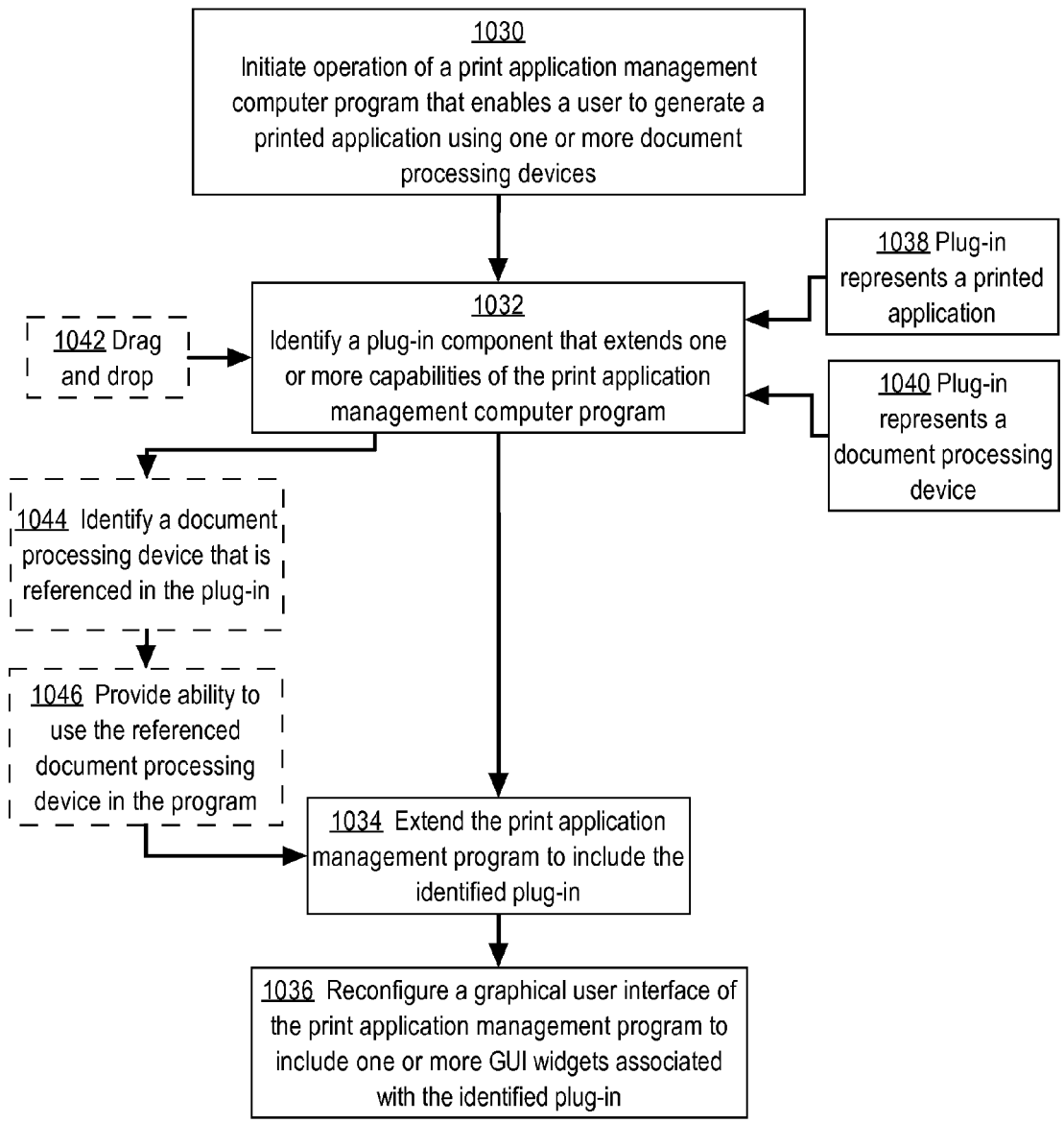
FIG. 10C illustrates another process of adding functional components to a production printing system.

FIG. 10C illustrates another process of adding functional components to a production printing system. In step 1030, operation is initiated of a print application management computer program that enables a user to generate a printed application using one or more document processing devices. For example, the print management application illustrated for application production logic 190 may be used.

In step 1032, the process identifies a plug-in that extends one or more capabilities of the print application management computer program. In various embodiments, the plug-in may represent a printed application, as in step 1038, or the plug-in represents a document processing device, as in step 1040. For example, as shown in FIG. 8, FIG. 9, plug-ins may represent various kinds of printers, finishers, scanners, and other document processing devices, or may represent business cards, brochures, reports, or other kinds of printed applications in a hierarchy of applications.

Identifying a plug-in in step 1032 may occur in several ways. The application production logic 190 may automatically search plug-ins that have been newly added to the system using programmatic means. Additionally or alternatively, as in step 1042, a user may drag and drop an icon representing a plug-in into a hierarchy of plug-ins using facilities of the GUI that is managed by the application production logic 190.

In step 1034, the print application management program is extended to include the identified plug-in. Mechanisms for extension have been previously described. Optionally, at step 1044, the process identifies a document processing that is referenced in the identified plug-in. In step 1046, the extension operation of step 1034 includes providing the print application management program with the ability to use the referenced document processing device in the program. As a result, a user acquires, at runtime and without restarting the system, the ability to use a new or different kind of document processing device to process a printed application.

Further, the extension of operation of step 1034 may also include, as shown at step 1036, reconfiguring a graphical user interface of the print application management computer program to include one or more GUI widgets associated with the identified plug-in.

Referring now to FIG. 10B, in step 1012, a user interface is generated. Generating the user interface at step 1012 may comprise initially displaying the GUI 908 as part of a startup process, or re-generating the GUI 908 in response to a new plug-in or other change in the folder hierarchy. In an embodiment, a graphical user interface is generated based on a GUI definition in a specified default folder. In an embodiment, a UIs (User Interfaces) Default folder is provided and a user-interface file within the UIs Default folder defines the graphical user interface (GUI) that appears when the application production logic 190 launches.

In step 1014, one or more available templates are discovered, and a list of the templates is generated and stored in memory. Discovery may comprise searching a Templates folder of the folder hierarchy of FIG. 9 to identify one or more files having file extensions matching a template type, opening the files and determining a name and/or an icon associated with the template. The list of templates may be displayed in the GUI 908 and each template may be represented as an icon.

In step 1020, a selection of a template is received from a user based on the list of discovered templates. For example, a user selects an icon representing a template in the GUI 908 and the print application management computer program receives the user selection through programmatic means. In response, the print application management computer program regenerates the GUI 908, if necessary, to reflect one or more GUI widgets for parameter values, settings or other aspects of an application represented in the selected template. For example, the GUI 908 may be updated to show numeric data entries, options, or other values necessary to define a printed application for a template. The particular GUI widgets may vary from template to template depending on its requirements.

In step 1024, a user selection of one or more files of artwork or variable data is received based on the GUI widgets that were generated from the selected template. For example, user input is received through the GUI 908 providing values for one or more variables, or an artwork file, for use in producing a printed application according to the template.

In step 1026, one or more user instructions are generated and displayed. The user instructions may inform the user how to format artwork for a printed application, send printable images to a printer, and/or move printed paper among machines. Particular techniques for providing instructions and performing such steps have been previously described in connection with FIG. 1 to FIG. 5. Instructions also may appear as prompt messages within the GUI 908.

3.2 Template Plug-In

In an embodiment, templates consist primarily of XML files. For example, a template for printing business cards specifies that the user's artwork should appear in specific locations on a sheet, and provides instructions for slicing the paper into business-card sized pieces. In an embodiment, the template does not specify a particular printer or other device by name or model number, but does specify that the printer or device shall accept heavyweight paper. The template also specifies cutting instructions. TABLE 1 comprises an example template.

TABLE 1

EXAMPLE BUSINESS CARD TEMPLATE

```
<template>
  <actions>
    <device class="printer" stepNumber="1" >
      <media>
        <weightRange>200+ gms</weightRange>
      </media>
    </device>
    <device class= "duplo645" slepNumber="2">
      <parameters>
        ...Duplo-specific data...
      < /parameters >
    </device>
  </actions>
</template>
```

In the example of TABLE 1, the "device" tags initially specify that a first step in production of business cards is to print on a printing device that is a subclass of a device class named "printer." Each such class may be an object class in an object-oriented programming language. The "media" tags specify that the printer must accept heavy paper. The next "device" tags specify that the second step in production requires a Duplo 645 machine. The "parameters" tags specify particular data for production on the Duplo machine.

In an embodiment, when application production logic 190 loads the template of TABLE 1, the application production logic looks up "printer" and "duplo645" in a stored list of available classes. Assume that the application production logic 190 locates several classes deriving from a superclass called Printer, such as Aficio5560Fiery and Aficio5560GW. In response, application production logic 190 instantiates such classes and determines if the "weightRange" request is compatible.

If the "weightRange" request is compatible, then application production logic 190 determines whether actual, connected printers of those types are in a list of registered printers. If a matching registered printer is found, in response, application production logic 190 prompts the user to choose one of the registered printers. The application production logic 190 also prompts the user to load an appropriate paper into an appropriate print tray.

Assume further that application production logic 190 locates only one class named Duplo645. In response, application production logic 190 follows the same procedure as described above for the printers, but if a Duplo645 is not physically available, the application production logic displays a message that the system cannot complete tasks required to make business cards using the selected template. Significantly, in an embodiment, application production logic 190 only terminates one task among a plurality of tasks that are defined in the template; the printing step is allowed to proceed.

3.3 Graphical User Interface Plug-In

In an embodiment, application production logic 190 loads the GUI.dll file and determines that the DLL implements a programmatic interface denoted IFrontEnd. In an embodiment, application production logic 190 is configured to require an implementation of an interface denoted IFrontEnd to permit users to add artwork, select templates, and run print jobs. If only one IFrontEnd implementation is found, or if such a plug-in is in the UIs Default folder, then an object of the class IFrontEnd is created when the application production logic 190 runs. If the class generates a GUI window that launches automatically, then that window becomes the main user interface.

The GUI can have any level of detail provided that all features of a front end are implemented. Indeed, in an embodiment, no GUI is required at all. In one embodiment, an automated testing plug-in performs regression tests and writes results to a log file; in this embodiment, placing the testing plug-in in the "default" directory provides logic for testing the application production logic 190 and writing output data to the log file. Additionally or alternatively, third-party user interfaces, with graphics or without, can be added to the system in the same manner.

3.4 Printer Plug-In

In an embodiment, when discovers a plug-in for a printer, the application production logic searches in the plug-in file application production logic 190 for a communications object that implements communication information to and from the device, and for a user-interface object that implements user interface widgets that enable the user to control that device.

For example, a finisher plug-in may provide GUI buttons or other controls for downloading appropriate instructions to the device, and for either processing a single sheet by slicing it and creasing it or for processing the entire stack of sheets placed in the machine. As another example, a printer plug-in may accept a printable file from the user interface and may define GUI controls that enable the user to preview and print the file. The printer plug-in may also comprise logic that can generate a Print Preview window in which the actual pixels that will be sent to the printer are displayed.

3.5 Glossary

In certain embodiments, the following terms have the following meanings.

Application (or "print application" or "business application"): a finished, printed product that someone might pay money for, such as business cards, books, postcards, restaurant menus, etc. Variations are considered different applications; examples of variations of business cards include single-sided business cards, double-sided business cards, foldable business cards, vertical business cards, business cards with logos in the upper-left corner, etc. An application combines a template with a user's artwork and text.

Finish (noun): a treatment applied to a piece of paper, such as creasing, folding, stapling, hole punching, cutting, laminating, or binding. There are typically multiple finishing devices, or finishers, involved in producing printed documents, but some applications may involve unfinished sheets.

Job: see Print Job.

Layout: the arrangement of text and graphics on a sheet of paper.

Media (or stock): refers to the characteristics of a particular sheet of paper: thickness (in microns or millimeters), weight (grams per square meter of a single sheet), transparency (yes or no), coatings on front or back, color, brightness (reflectivity), % of recycled material (all of which affect the way colored inks and toners will appear), etc. The term also implicitly refers to the speed of a job; heavier and/or coated stocks will require slower print speeds, which can double the time a print job can take. Time issues can greatly affect large applications that are produced in large volume.

Print Job, or simply Job: a description of an application as the customer desires to see it. For example, a job would specify not only that the customer wishes to print "business cards," but also: exactly what type of business cards, the artwork to go on the cards and where, the number of business cards to print, the type of media on which to print them, and so on. In an embodiment, print jobs additionally specify a template which pre-selects some of the configuration options.

Printer refers to either a machine that renders text and graphics onto one or more sheets of paper, or a person or company that specializes in using printers. See production printing.

Production Printing: an industry in which individual businesses (print shops) generally print hundreds or thousands of applications each day. A company that prints newspapers and books is an example. Another example is a university printing department, responsible for printing the Annual Report, banners, flyers, and custom course booklets, as well as the employees' business cards.

Sheet: a sheet of paper. Implicitly refers to the size of that paper: an 8.5"×11" sheet ("letter"-sized paper), an 11"×17" sheet ("tabloid"-sized paper), etc.

Stock: see media.

Variable-data printing (VDP): the process of combining a set of data referring to numerous people with the graphics and/or text of a particular-print job, resulting in a custom-looking print job for every person in the data set.

Device: a printer or a finisher.

Discovery: the process of searching for and finding plug-ins, not crashing if the plug-ins are not found, disabling the plug-ins (or parts of plug-ins) that depend on plug-ins that are missing or faulty, and alerting the user that such plug-ins are unavailable.

Formatter: a process that converts graphics and page-description files (like Adobe PDF files) from one format to another, and that combines these files in preparation for being laid out on a sheet of paper. In an embodiment, a formatter can receive and respond electronically to formatting requests from a print application management computer program.

Plug-In: a collection of files comprising, in one embodiment: instructions that enables a management application to communicate with a process outside the application, such as a formatter, printer, or finisher; a set of predefined parameters that can be sent to the plug-in; and optionally instructions which when executed cause displaying a portion of a graphical user interface enabling a human to specify or modify the commands sent to the plug-in.

Template: a combination of a sheet size value, a media type value, an arrangement (or layout) of applications on a sheet, a set of end-user instructions to be printed onto the sheet, and the parameters for the programming commands that can be sent to different devices involved in printing and finishing the sheet. For example, a "12-by-18-inch business-card template" may refer to a certain style of business card, and specify the commands that will slice a 12-by-18-inch sheet of thick paper into individual business cards.

3.6 Other Disclosure

The disclosure also encompasses:

In an embodiment, an apparatus comprising: in a print application management computer program that enables a user to generate a printed application using one or more document processing devices: means for identifying a plug-in that extends one or more capabilities of the print application management computer program; means for extending the print application management computer program to include the identified plug-in, including reconfiguring a graphical user interface of the print application management computer program to include one or more GUI widgets associated with the identified plug-in. In one feature, said identified plug-in represents a printed application. In another feature, said identified plug-in represents a document processing device.

In a further feature, the apparatus further comprises means for identifying a document processing device plug-in that is referenced in said identified printed application plug-in; and said extended print management computer program includes the ability to use said document processing device for the processing of said printed application.

In an embodiment, the identifying means further comprises means for receiving said identified plug-in through user input associated with dragging a representation of the plug-in into a hierarchical tree of other plug-ins. In an embodiment, the apparatus further comprises means for determining one or more second plug-ins that are referenced in the identified plug-in; means for determining whether the second plug-ins are available; means for disabling the first plug-in and generating a user notification when one or more of the second plug-ins is not available; means for performing the extending only when all of the second plug-ins are available.

In an embodiment, the apparatus further comprises means for receiving first user input that selects a template for a printed application, and the template identifies one or more document processing devices for use in producing the printed application; means for receiving second user input that specifies one or more artwork elements or data variables; means for generating user instructions for formatting the artwork elements or data variables as defined in the template and as required by the document processing devices, sending one or more printable images to the document processing devices, and moving printed sheets among the document processing devices according to the template to result in generating the printed application. In an embodiment, the means for generating user instructions comprises means for generating printed user instructions.

In an embodiment, the apparatus further comprises means for identifying, within a particular one of the plug-ins, a description of one of the document processing devices; means for determining, by attempting network communications to the document processing device, whether the document processing device is available; means for generating a user notification when the document processing device is not available.

In an embodiment, the apparatus further comprises means for receiving an application identifier value associated with a printed application; means for receiving a media size; means for receiving a machine identifier value associated with a first document processing machine; means for determining programming instructions for a second document processing machine based on said received application identifier value, media size, and machine identifier value.

In an embodiment, the apparatus further comprises means for sending said programming instructions over a network to the second document processing machine. In an embodiment, the means for receiving said machine identifier comprises means for receiving the machine identifier from data entered from any of a computer display, or a handheld device display. In an embodiment, the apparatus further comprises means for determining the programming instructions for said first document processing machine; and said determinations are made at substantially the same time.

In an embodiment, the apparatus further comprises means for receiving artwork of the printed application; means for receiving one or more selections of a plurality of document processing machines; means for formatting said artwork into a printable format that is compatible for processing by the document processing machines of the one or more selections. In an embodiment, the means for formatting comprises means for specifying a plurality of printed applications on each printed sheet. In an embodiment, the means for formatting comprises means for generating a plurality of operator instructions on a printed sheet. In an embodiment, the means for generating comprises means for generating particular operator instructions which when used with a document processing machine cause the document processing machine to remove at least one, but not all of said plurality of operator instructions. In an embodiment, based on said selections of the plurality of document processing machines, the means for formatting comprises means for positioning said artwork at an integral multiple of the precision level of the least precise document processing machine.

In an embodiment, an apparatus comprises, in a print application management computer program that enables a user to generate a printed application using one or more document processing devices, means for identifying a plug-in that extends one or more capabilities of the print application management computer program, and said identified plug-in represents a printed application; means for extending the print application management computer program to include the identified plug-in, including reconfiguring a graphical user interface of the print application management computer program to include one or more GUI widgets associated with the identified plug-in; means for identifying a document processing device plug-in that is referenced in said identified printed application plug-in using one or more programmatic object classes; and said extended print management computer program includes the ability to use said document processing device for the processing of said printed application.

In an embodiment, said identified plug-in comprises one or more executable code elements for interfacing to said document processing device for the processing of said printed application, and a graphical image depicting or representing said document processing device.

4.0 Implementation Mechanisms—Hardware Overview

FIG. 6 illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when executed by one or more processors, cause:
   providing a print application management computer program that enables a user to initiate generation of a printed application using one or more document processing devices;
   identifying a plug-in that extends one or more capabilities of the print application management computer program;
   extending the print application management computer program to include the identified plug-in, including reconfiguring a graphical user interface of the print application management computer program to include one or more GUI widgets associated with the identified plug-in.

2. The one or more non-transitory computer-readable media of claim 1, wherein said identified plug-in represents a printed application.

3. The one or more non-transitory computer-readable media of claim 2, wherein the instructions, when executed by one or more processors, further cause:
   identifying a document processing device plug-in that is referenced in said identified printed application plug-in;
   wherein said extended print management computer program includes the ability to use said document processing device for the processing of said printed application.

4. The one or more non-transitory computer-readable media of claim 1, wherein said identified plug-in represents a document processing device.

5. The one or more non-transitory computer-readable media of claim 1, wherein the identifying comprises receiving said identified plug-in through user input associated with dragging a representation of the plug-in into a hierarchical tree of other plug-ins.

6. The one or more non-transitory computer-readable media of claim 1, wherein the instructions, when executed by one or more processors, further cause:
   determining one or more second plug-ins that are referenced in the identified plug-in;
   determining whether the second plug-ins are available;
   when one or more of the second plug-ins is not available, disabling the first plug-in and generating a user notification;
   performing the extending only when all of the second plug-ins are available.

7. The one or more non-transitory computer-readable media of claim 1, wherein the instructions, when executed by one or more processors, further cause:
receiving first user input that selects a template for a printed application, wherein the template identifies one or more document processing devices for use in producing the printed application;
receiving second user input that specifies one or more artwork elements or data variables;
generating user instructions for formatting the artwork elements or data variables as defined in the template and as required by the document processing devices, sending one or more printable images to the document processing devices, and moving printed sheets among the document processing devices according to the template to result in generating the printed application.

8. The one or more non-transitory computer-readable media of claim 7, wherein generating user instructions comprises generating printed user instructions.

9. The one or more non-transitory computer-readable media of claim 7, wherein the instructions, when executed by one or more processors, further cause:
identifying, within a particular one of the plug-ins, a description of one of the document processing devices;
determining, by attempting network communications to the document processing device, whether the one of the document processing devices is available;
generating a user notification when the one of the document processing devices is not available.

10. The one or more non-transitory computer-readable media of claim 1, wherein the instructions, when executed by one or more processors, further cause:
receiving an application identifier value associated with a printed application;
receiving a media size;
receiving a machine identifier value associated with a first document processing machine;
determining programming instructions for a second document processing machine based on said received application identifier value, media size, and machine identifier value.

11. The one or more non-transitory computer-readable media of claim 10, wherein the instructions, when executed by one or more processors, further cause sending said programming instructions over a network to the second document processing machine.

12. The one or more non-transitory computer-readable media of claim 10, wherein receiving said machine identifier comprises receiving the machine identifier from data entered from any of a computer display, or a handheld device display.

13. The one or more non-transitory computer-readable media of claim 10, wherein the instructions, when executed by one or more processors, further cause determining the programming instructions for said first document processing machine; wherein said determinations are made at substantially the same time.

14. The one or more non-transitory computer-readable media of claim 10, wherein the instructions, when executed by one or more processors, further cause:
receiving artwork of the printed application;
receiving one or more selections of a plurality of document processing machines;
formatting said artwork into a printable format that is compatible for processing by the document processing machines of the one or more selections.

15. A method comprising:
In a print application management computer program that enables a user to initiate generation of a printed application using one or more document processing devices:
identifying a plug-in that extends one or more capabilities of the print application management computer program,
extending the print application management computer program to include the identified plug-in, including reconfiguring a graphical user interface of the print application management computer program to include one or more GUI widgets associated with the identified plug-in;
where the method is performed by one or more computing devices.

16. The method of claim 15, wherein said identified plug-in represents a printed application.

17. The method of claim 16, further comprising:
identifying a document processing device plug-in that is referenced in said identified printed application plug-in;
wherein said extended print management computer program includes the ability to use said document processing device for the processing of said printed application.

18. The method of claim 15, wherein said identified plug-in represents a document processing device.

19. One or more non-transitory computer-readable media storing instructions which, when executed by one or more processors, cause:
providing a print application management computer program that enables a user to initiate generation of a printed application using one or more document processing devices;
identifying a plug-in that extends one or more capabilities of the print application management computer program, wherein said identified plug-in represents a printed application;
extending the print application management computer program to include the identified plug-in, including reconfiguring a graphical user interface of the print application management computer program to include one or more GUI widgets associated with the identified plug-in;
identifying a document processing device plug-in that is referenced in said identified printed application plug-in using one or more programmatic object classes;
wherein said extended print management computer program includes the ability to use said document processing device for the processing of said printed application.

20. The one or more non-transitory computer-readable media of claim 19, wherein said identified plug-in comprises one or more executable code elements for interfacing to said document processing device for the processing of said printed application, and a graphical image depicting or representing said document processing device.

* * * * *